US009623852B2

(12) United States Patent
Ishida et al.

(10) Patent No.: US 9,623,852 B2
(45) Date of Patent: Apr. 18, 2017

(54) VEHICULAR BRAKE CONTROLLER

(71) Applicant: ADVICS CO., LTD., Kariya, Aichi-pref. (JP)

(72) Inventors: Yasuhito Ishida, Kariya (JP); Yusuke Nakagawa, Kariya (JP); Ken Kudo, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/780,107

(22) PCT Filed: Mar. 27, 2014

(86) PCT No.: PCT/JP2014/059030
§ 371 (c)(1),
(2) Date: Sep. 25, 2015

(87) PCT Pub. No.: WO2014/157582
PCT Pub. Date: Oct. 2, 2014

(65) Prior Publication Data
US 2016/0031423 A1  Feb. 4, 2016

(30) Foreign Application Priority Data

Mar. 27, 2013  (JP) .................................. 2013-066012

(51) Int. Cl.
*B60T 13/68* (2006.01)
*B60T 8/34* (2006.01)
(Continued)

(52) U.S. Cl.
CPC ............ *B60T 8/348* (2013.01); *B60T 8/4045* (2013.01); *B60T 8/4872* (2013.01);
(Continued)

(58) Field of Classification Search
CPC ... B60T 8/17; B60T 8/26; B60T 8/348; B60T 8/3655; B60T 8/4872; B60T 13/148; B60T 13/686
(Continued)

(56) References Cited

U.S. PATENT DOCUMENTS

| 5,941,614 A | 8/1999 | Gallery et al. |
| 6,913,326 B1 | 7/2005 | Ohkubo et al. |
| 2013/0207451 A1* | 8/2013 | Ohkubo ................ B60T 8/3655 |
| | | 303/9.62 |

FOREIGN PATENT DOCUMENTS

| JP | 10-507145 A | 7/1998 |
| JP | 2000-095094 A | 4/2000 |

(Continued)

OTHER PUBLICATIONS

International Search Report (PCT/ISA/210) mailed on Jul. 1, 2014, by the Japanese Patent Office as the International Searching Authority for International Application No. PCT/JP2014/059030.
(Continued)

*Primary Examiner* — Christopher Schwartz
(74) *Attorney, Agent, or Firm* — Buchanan Ingersoll & Rooney PC

(57) ABSTRACT

When driving of a motor is on and W/C pressure of a low-pressure-side wheel is increased, the driving of the motor is continued until the actual W/C pressure of a high-pressure-side wheel in the same system reaches a predetermined range relative to a target pressure. Specifically, if the target pressure of the low-pressure-side wheel is greater than a predetermined value, the braking hydraulic pressure of the low-pressure-side wheel is increased, the motor is driven, and to account for a resulting decrease in the W/C pressure of the high-pressure-side wheel, the driving of the motor is continued until the W/C pressure of the high-pressure-side wheel is restored. Temperature increases in the
(Continued)

motor can thereby be prevented and durability can be improved by shortening the drive time of the motor as much as possible.

5 Claims, 16 Drawing Sheets

(51) Int. Cl.
    *B60T 8/48*          (2006.01)
    *B60T 8/40*          (2006.01)
    *B60T 13/14*         (2006.01)
    *B60T 13/66*         (2006.01)

(52) U.S. Cl.
    CPC .......... *B60T 13/146* (2013.01); *B60T 13/662* (2013.01); *B60T 13/686* (2013.01)

(58) Field of Classification Search
    USPC ............. 303/9.62, 10, 11, 115.1, 115.4, 155, 303/186–188
    See application file for complete search history.

(56) References Cited

FOREIGN PATENT DOCUMENTS

| | | |
|---|---|---|
| JP | 2000-219120 A | 8/2000 |
| JP | 2008-221866 A | 9/2008 |

OTHER PUBLICATIONS

Written Opinion (PCT/ISA/237) mailed on Jul. 1, 2014, by the Japanese Patent Office as the International Searching Authority for International Application No. PCT/JP2014/059030.

\* cited by examiner

FIG. 2B

| | |
|---|---|
| 20 | DIFFERENTIAL PRESSURE CONTROL VALVE |
| 30, 31 | PRESSURE INCREASE CONTROL VALVE |
| 32, 33 | PRESSURE DECREASE CONTROL VALVE |
| 11 | MOTOR |
| 50 | BRAKE ECU |
| 51a, 51b, 51c, 51d | WHEEL VELOCITY SENSOR |
| 52a, 52b, 52c, 52d | W/C PRESSURE SENSOR |

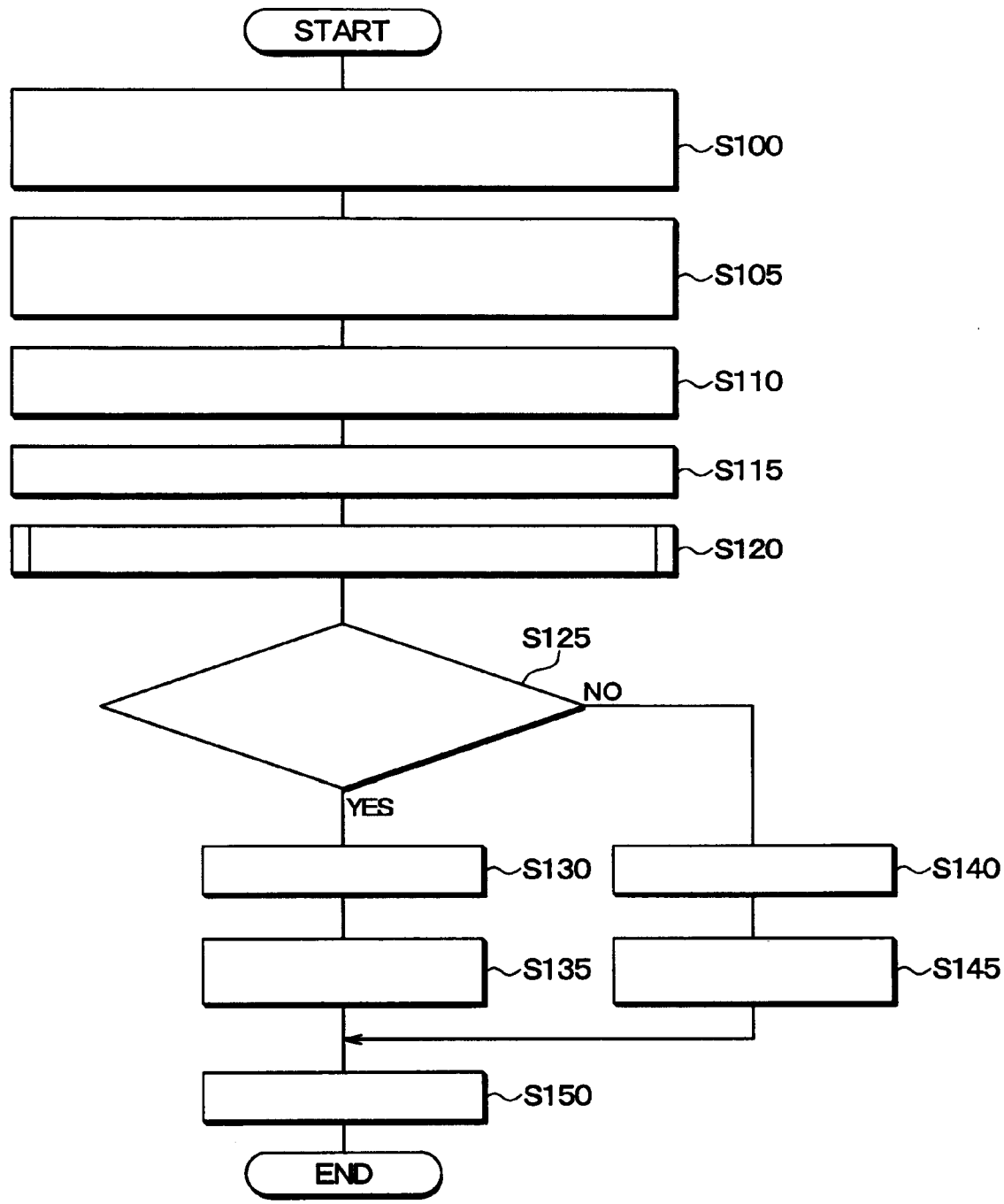

FIG. 3B

S100  OBTAIN ACTUAL W/C PRESSURE (WCFL, WCFR, WCRL, WCRR) FROM W/C

PRESSURE OF EACH WHEEL

WCall ← WCFL + WCFR + WCRL + WCRR

S105  ACQUIRE TARGET OIL PRESSURE OF EACH WHEEL (TPFL, TPFR, TPRL, TPRR) FROM

EACH APPLICATION (e.g. TRC)

TPall ← TPFL + TPFR + TPRL + TPRR

S110  UPDATE PRECEDING CONTROL OIL PRESSURE MCP OF EACH WHEEL

MCP ← CONTROL OIL PRESSURE CP (PRECEDING CALCULATION VALUE AT

THIS TIME POINT)

S115  CALCULATE CONTROL OIL PRESSURE CP** OF EACH WHEEL

S120  MOTOR OUTPUT DETERMINATION PROCESSING

S125  MOTOR REQUEST FLAGS (MREQ**) OF ALL WHEELS ARE OFF?

S130  TURN OFF MOTOR

S135  CLEAR MOTOR ON PERIOD TIMER Con

S140  TURN ON MOTOR

S145  INCREMENT MOTOR ON PERIOD TIMER Con

S150  OUTPUT TO SOLENOID OF EACH WHEEL

FIG. 4B

S200   HIGH-PRESSURE-SIDE WHEEL DETERMINATION PROCESSING

S205   (WC IS CONSTANT FOR CERTAIN TIME) OR (WC $\geq$ TP) OR (TP > MTP)

S210   (OWN WHEEL IS BEING DEPRESSURIZED) OR

{(HIGH-PRESSURE-SIDE WHEEL FLAG IS OFF) AND (SYMMETRICAL WHEEL IS BEING DEPRESSURIZED)}

S215   (TP > WC + Pth1) OR (TPall > WCall + Pth2)

S235   TURN OFF INERTIA PRESSURIZATION ONGOING FLAG

MTP** = 0

FIG. 4D

S220 (MOTOR ON TIME Con > Ton) AND (TP ≦ WC + Pth3) AND (TP** ≦ WCall + Pth4)

S225 {(TP > WC) AND (WC** is nearly equal to 0)} OR

{(HIGH-PRESSURE-SIDE WHEEL FLAG IS ON) AND (INERTIA PRESSURIZATION ONGOING FLAG IS OFF) AND (TP > WC)}

S230 (HIGH-PRESSURE-SIDE WHEEL FLAG IS OFF) AND (OWN WHEEL IS BEING PRESSURIZED)

S240 TURN OFF INERTIA PRESSURIZATION ONGOING FLAG

MTP** = 0

S245 MOTOR REQUEST FLAG OF EACH WHEEL

MREQ** = ON

S250 TURN ON INERTIA PRESSURIZATION ONGOING FLAG

MTP ← TP

S265 LOW-PRESSURE-SIDE CONTROL PRESSURE CORRECTION

S270 MOTOR REQUEST FLAG OF EACH WHEEL

MREQ** = OFF

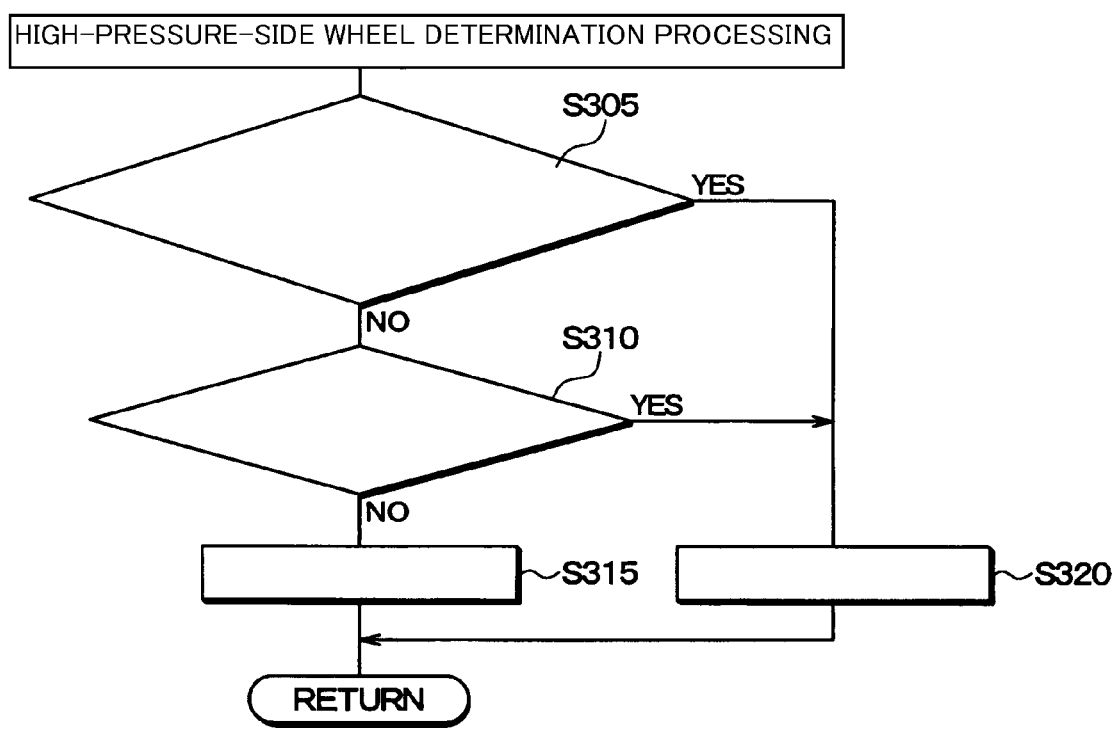

FIG. 5B

S305 |W/C PRESSURE OF OWN WHEEL − W/C PRESSURE OF SYMMETRICAL WHEEL IN SAME SYSTEM| < DIFFERENTIAL PRESSURE EXISTING THRESHOLD KPD?

S310 W/C PRESSURE OF OWN WHEEL ≧ W/C PRESSURE OF SYMMETRICAL WHEEL IN SAME SYSTEM?

S315 TURN OFF HIGH-PRESSURE-SIDE WHEEL FLAG

S320 TURN ON HIGH-PRESSURE-SIDE WHEEL FLAG

FIG. 6B

S400  (TP∗∗ ≦ WC∗∗ + Pth1) AND (MREQ∗∗ = OFF)

S405  (MCP∗∗ + Ups1 < CP∗∗) AND (LOW PRESSURE SUPPRESSION STORAGE FLAG IS ON)

S410  CP∗∗ ← MCP∗∗ + Ups1

S415  CP∗∗ ← MCP∗∗

S420  TURN ON LOW PRESSURE SUPPRESSION STORAGE FLAG

S425  TURN OFF LOW PRESSURE SUPPRESSION STORAGE FLAG

VEHICULAR BRAKE CONTROLLER

TECHNICAL FIELD

The present invention relates to a vehicular brake controller configured to control a braking hydraulic pressure of each wheel by causing a motor to drive a pump in a hydraulic pressure circuit included in the vehicular brake controller.

BACKGROUND ART

There has been conventionally proposed a vehicular brake controller configured to turn ON a motor and drive a pump to increase braking force when a deviation between target velocity and vehicle velocity increases, and turn OFF the motor and stop the pump when the deviation decreases, during vehicle velocity control performed to allow the vehicle to travel on a descending road at predetermined velocity, for example (see Patent Literature 1). The motor turned ON when necessary and turned off otherwise in this manner prevents temperature increase and improves durability of the motor, in comparison to a motor constantly kept ON during vehicle velocity control. Such vehicle velocity control is performed by generating braking force independently at each wheel. The motor is turned ON to increase a braking hydraulic pressure (hereinafter, referred to as a W/C pressure) applied to a wheel cylinder (hereinafter, referred to as a W/C) of a control target wheel and increase braking force of the control target wheel.

Meanwhile, Patent Literature 2 discloses a vehicular brake controller configured to stop driving a motor when a required hydraulic pressure change grade as a difference obtained by subtracting a preceding target pressure from a current target pressure falls within a predetermined range, in order to reduce a motor operation frequency while driving the motor and performing pump pressurization.

CITATION LIST

Patent Literature

Patent Literature 1: JP H10-507145 A
Patent Literature 2: JP 2000-095094 A

SUMMARY OF INVENTION

Technical Problems

However, when the W/C pressure of a low-pressure-side wheel is increased in a state where there is a difference in W/C pressure between wheels in a same system in the hydraulic pressure circuit included in the vehicular brake controller, brake fluid shifts from a high-pressure-side wheel to the low-pressure-side wheel and the W/C pressure of the high-pressure-side wheel is decreased. The high-pressure-side wheel fails to have an intended W/C pressure and vehicle velocity control cannot be achieved accurately. As disclosed in Patent Literature 2, particularly in a case where the motor is turned OFF to stop the pump even during vehicle velocity control in order for prevention of temperature increase and improvement in durability of the motor and in a case where output from the pump is low immediately after the motor is turned ON or while the motor has low output, the amount of brake fluid discharged from the pump is insufficient for keeping the W/C pressure of the high-pressure-side wheel as well as increasing the W/C pressure of the low-pressure-side wheel.

In view of the above disadvantages, an object of the present invention is to provide a vehicular brake controller configured to suppress the effect of decrease in W/C pressure of a high-pressure-side wheel caused by brake fluid shifting from the high-pressure-side wheel to a low-pressure-side wheel in a state where there is a difference in W/C pressure between the wheels in a same system.

Solution to Problems

In order to achieve the object mentioned above, according to the present invention, a hydraulic pressure control means (50) is configured to control a braking hydraulic pressure generated at each of the W/Cs (4 and 5) by controlling the motor (11) and the control valves (30 and 31) and includes a target pressure acquiring means (S105) configured to acquire a target pressure having a target value of a hydraulic pressure applied to each of the W/Cs (4 and 5) by vehicle brake control, and an actual pressure obtaining means (S100) configured to obtain an actual W/C pressure actually generated at each of the W/Cs (4 and 5). When the motor (11) starts being driven to pressurize the W/C of a low-pressure-side wheel having the lower actual W/C pressure out of the W/Cs (4 and 5) in a same system, the hydraulic pressure control means (50) performs hydraulic pressure restoration control of continuously driving the motor (11) until the actual W/C pressure of a high-pressure-side wheel having the higher actual W/C pressure out of the W/Cs (4 and 5) in the same system falls in a predetermined range relative to the target pressure of the wheel.

In this configuration, by shortening drive time of the motor (11) as much as possible, prevention of temperature increase and improvement in durability of the motor (11) can be achieved and the W/C pressure of the high-pressure-side wheel having been decreased by shift can be restored appropriately. It is thus possible to suppress the effect of decrease in W/C pressure of the high-pressure-side wheel due to the shift.

According to the present invention, shift suppression control of stopping pressurization of the W/C (4 or 5) of the low-pressure-side wheel and turning OFF the motor (11) is performed when the low-pressure-side wheel has a difference between the target pressure and the actual W/C pressure being less than a predetermined value (Pth1).

In such a case where the difference between the target pressure and the actual W/C pressure of the low-pressure-side wheel is less than the predetermined value (Pth1), the shift suppression control is performed to suppress shift as well as decrease in W/C pressure of the high-pressure-side wheel.

According to the present invention, when the difference between the target pressure and the actual W/C pressure of the low-pressure-side wheel exceeds the predetermined value (Pth1), the hydraulic pressure control means (50) sets a control oil pressure of not more than a predetermined pressurization grade in accordance with the target pressure, controls the control valves (30 and 31) to cause the actual W/C pressure to reach the control oil pressure, and turns ON the motor (11).

The control oil pressure is not increased quickly but is made to be not more than the predetermined pressurization grade in this manner. The control oil pressure can thus be increased gradually to the target pressure. This suppresses increase in hydraulic pressure variation and prevents any effect to vehicle behavior.

According to the present invention, the hydraulic pressure control means (50) includes a shift determination means (S200) configured to determine, in accordance with a difference in W/C pressure of the wheels in the same system, that shift of brake fluid possibly occurs to the low-pressure-side wheel from the high-pressure-side wheel as another wheel with respect to the low-pressure-side wheel in the same system, and performs at least one of the hydraulic pressure restoration control and the shift suppression control when the shift determination means (S200) determines that the shift possibly occurs.

In the state where shift can possibly occur, the hydraulic pressure restoration control or the shift suppression control may be performed as described above.

According to the present invention, the hydraulic pressure control means (50) does not perform the shift suppression control when the actual W/C pressure of the low-pressure-side wheel is 0 MPa.

Control of increasing the W/C pressure starts when the W/C pressure is 0 MPa. In this case, the brake has play such as clearance between a brake pad and a brake disc. Such play of the brake can be decreased by not performing the shift suppression control when the W/C pressure is 0 MPa. Braking force can be generated with a high degree of responsiveness in this case.

According to the present invention, the hydraulic pressure control means (50) neither performs the shift suppression control nor turns ON the motor while the wheel cylinder of the high-pressure-side wheel is being depressurized even if the wheel cylinder of the low-pressure-side wheel is being pressurized.

While the high-pressure-side wheel cylinder is being depressurized, even if shift occurs, depressurization reduces the effect of such shift. There is thus less need to perform the shift suppression control. Meanwhile, the low-pressure-side wheel cylinder can be pressurized by shift from the high-pressure-side wheel cylinder. The pressurization can thus be achieved even if the motor is kept OFF. It is thus possible to pressurize the low-pressure-side wheel cylinder as well as achieve prevention of temperature increase and improvement in durability of the motor with decrease in operation frequency of the motor.

Those reference signs in parentheses respectively denoted to the means mentioned above exemplify the correspondences to specific means mentioned in the embodiments to be described later.

BRIEF DESCRIPTION OF DRAWINGS

FIG. 2B is a caption of FIG. 2A.

FIG. 3A is a flowchart of detailed shift suppression control processing.

FIG. 3B is a caption of FIG. 3A.

FIG. 4B is a caption of FIG. 4A.

FIG. 4D is a caption of FIG. 4C.

FIG. 5A is a flowchart of detailed high-pressure-side wheel determination processing.

FIG. 5B is a caption of FIG. 5A.

FIG. 6B is a caption of FIG. 6A.

DESCRIPTION OF EMBODIMENTS

The embodiments of the present invention will be described below with reference to the drawings. It is noted that same or equivalent portions are to be denoted by same reference signs in the following embodiments.

First Embodiment

Figure 1:
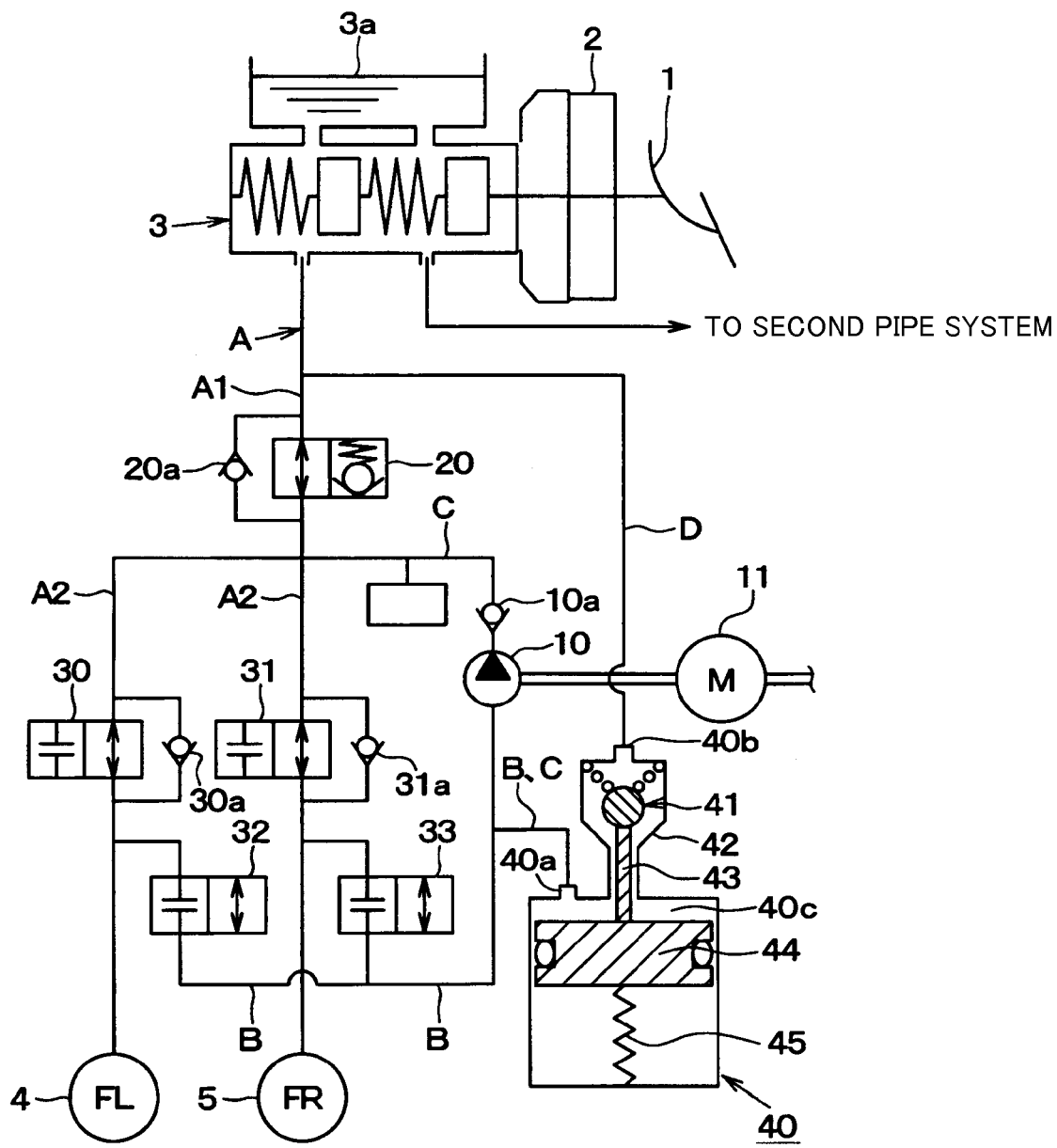
FIG. 1 is a schematic view of a vehicular brake controller according to a first embodiment of the present invention.
Figure 2A:
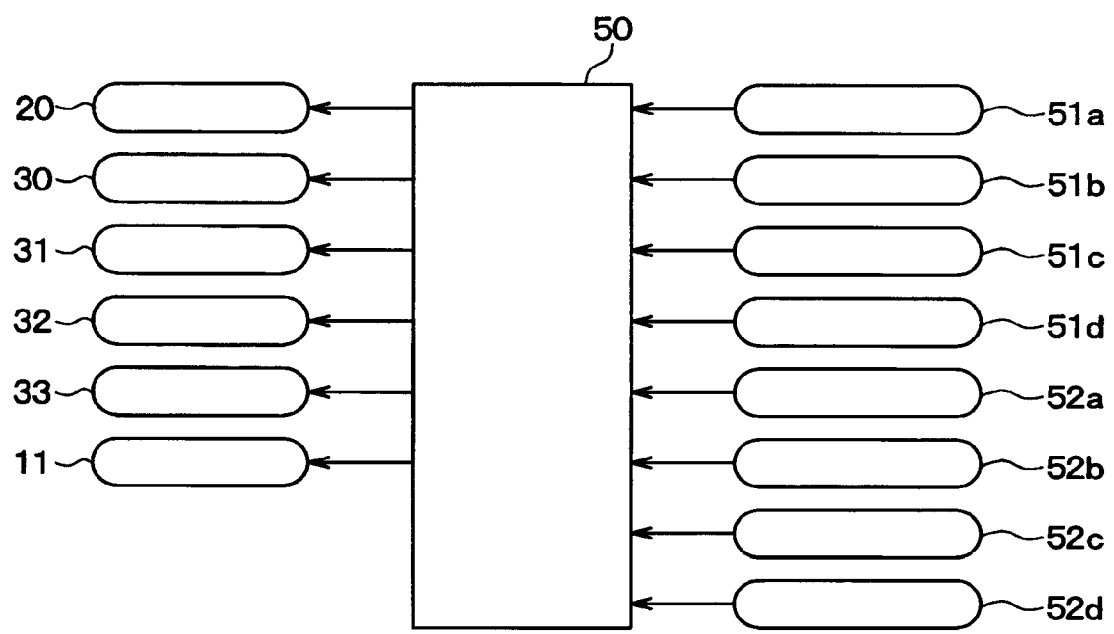
FIG. 2A is a block diagram of relations in a control system of the vehicular brake controller.

FIG. 1 is a schematic view of a vehicular brake controller according to an embodiment of the present invention. FIG. 2A is a block diagram of relations in a control system of the vehicular brake controller. A basic configuration of the vehicular brake controller according to the present embodiment will now be described with reference to these figures.

FIG. 1 depicts only a first pipe system in the vehicular brake controller, while a second pipe system is configured similarly. Described herein is a case where the vehicular brake controller according to the present embodiment is applied to a front wheel drive vehicle provided with a hydraulic pressure circuit for front and rear pipes including a front wheel pipe system and a rear wheel pipe system. The vehicular brake controller is also applicable to an X pipe and the like.

As depicted in FIG. 1, a brake pedal 1 is connected with a booster 2 configured to boost a brake pedal pressure or the like. The booster 2 includes a push rod configured to transmit boosted pedal force to a master cylinder (hereinafter, referred to as an M/C) 3, and the like. The push rod is configured to press a master piston provided to the M/C 3 to generate an M/C pressure. The M/C pressure is transmitted to a W/C 4 for a front left wheel FL and a W/C 5 for a front right wheel FR by way of a braking hydraulic pressure control actuator configured to perform antilock braking (hereinafter, referred to as ABS) control and the like. The M/C 3 is connected with a master reservoir 3a so as to supply brake fluid into the M/C 3 and store surplus brake fluid in the M/C 3.

There are provided the first pipe system configured to generate a W/C pressure to each of the front right wheel FR and the front left wheel FL as well as the second pipe system configured to generate a W/C pressure to each of a rear left wheel RL and a rear right wheel RR. The first pipe system and the second pipe system are basically configured similarly to each other, and the first pipe system will thus be described below.

The vehicular brake controller includes a conduit line (main conduit line) A connected to the M/C 3. The conduit line A is provided with a check valve 20a and a differential pressure control valve 20 controlled by an electronic control unit for brake control (hereinafter, referred to as a brake ECU) 50 depicted in FIGS. 2A and 2B. The differential pressure control valve 20 divides the conduit line A into two sections. Specifically, the conduit line A is divided into a conduit line A1 configured to receive a M/C pressure from the M/C 3 to the differential pressure control valve 20 and a conduit line A2 from the differential pressure control valve 20 to the W/Cs 4 and 5.

The differential pressure control valve 20 is regularly in a communicating state but comes into a state for generating a predetermined differential pressure (a differential pressure state) between the M/C and the W/C when a W/C pressure more than the M/C pressure is generated at the W/C 4 or 5, upon traction (hereinafter, referred to as TRC) control, vehicle velocity control, or the like is performed.

The conduit line A2 is branched to two portions. One portion has a pressure increase control valve 30 configured to control increase in braking hydraulic pressure to the W/C 4 whereas the other portion has a pressure increase control valve 31 configured to control increase in braking hydraulic pressure to the W/C 5.

These pressure increase control valves 30 and 31 are each configured as a two position valve controlled into communicating and blocking states by the brake ECU 50. When the pressure increase control valves 30 and 31 are controlled into the communicating state, the braking hydraulic pressure due to the M/C pressure or discharge from a pump 10 to be described later can be applied to each of the W/Cs 4 and 5. These pressure increase control valves 30 and 31 are each configured as a normally opened valve always controlled into the communicating state during normal braking with no vehicle brake control such as ABS control.

The pressure increase control valves 30 and 31 are provided with safety valves 30a and 31a in a parallel manner, respectively, configured to remove brake fluid from the W/Cs 4 and 5 when pressing the brake pedal is cancelled and ABS control terminates.

The conduit line A is connected with a conduit line (intake conduit line) B, at positions between the pressure increase control valves 30 and 31 and the W/Cs 4 and 5. The conduit line B is provided with pressure decrease control valves 32 and 33 controlled into the communicating and blocking states by the brake ECU 50. These pressure decrease control valves 32 and 33 are each configured as a normally closed valve always controlled into the blocking state during normal braking (with the ABS not in operation).

The conduit line B is connected to a first reservoir hole 40a provided in a pressure regulating reservoir 40. Brake fluid is caused to flow to the pressure regulating reservoir 40 through the conduit line B during ABS control or the like so as to control the braking hydraulic pressure at each of the W/Cs 4 and 5 and prevent locking tendency at each wheel.

A rotary pump 10 is provided on a conduit line (auxiliary conduit line) C connecting a position between the differential pressure control valve 20 and the pressure increase control valves 30 and 31 on the conduit line A to the first reservoir hole 40a in the pressure regulating reservoir 40. The rotary pump 10 has a safety valve 10a provided at a discharge end and configured to prevent brake fluid from counterflowing. The rotary pump 10 is connected with a motor 11 configured to drive the rotary pump 10.

There is further provided a conduit line (auxiliary conduit line) D connecting a second reservoir hole 40b in the pressure regulating reservoir 40 and the M/C 3.

The pressure regulating reservoir 40 regulates the differential pressure between the braking hydraulic pressure in the reservoir and the M/C pressure as well as supplies the rotary pump 10 with brake fluid. The first and second reservoir holes 40a and 40b provided in the pressure regulating reservoir 40 are each configured to communicate with a reservoir chamber 40c. The first reservoir hole 40a is connected to the conduit lines B and C so as to receive brake fluid discharged from the W/Cs 4 and 5 and supply the intake end of the rotary pump 10 with brake fluid. The second reservoir hole 40b is connected to the conduit line D so as to receive brake fluid from the M/C 3.

The pressure regulating reservoir 40 is provided, inside the second reservoir hole 40b, with a valve body 41 configured as a ball valve or the like. This valve body 41 contacts with and is separated from a valve seat 42 to control communication and block between the conduit line D and the reservoir chamber 40c. The valve body 41 is further regulated in distance from the valve seat 42 so as to regulate the differential pressure between the internal pressure of the reservoir chamber 40c and the M/C pressure. The valve body 41 is provided therebelow, separately from the valve body 41, with a rod 43 having a predetermined stroke and configured to vertically move the valve body 41. The reservoir chamber 40c accommodates a piston 44 configured to operate in association with the rod 43, and a spring 45 configured to press the piston 44 toward the valve body 41 and generate force of pressing brake fluid out of the reservoir chamber 40c.

When the pressure regulating reservoir 40 thus configured contains a predetermined amount of brake fluid, the valve body 41 is seated onto the valve seat 42 so as to prevent brake fluid from flowing into the pressure regulating reservoir 40. In this configuration, brake fluid flowing into the reservoir chamber 40c does not exceed the intake amount of the rotary pump 10. Furthermore, the intake end of the rotary pump 10 does not receive a high pressure.

The brake ECU 50 configures the control system of the vehicular brake controller. The brake ECU 50 is provided as a microcomputer including a CPU, a ROM, a RAM, an I/O, and the like, and is configured to perform various calculation in accordance with a program stored in the ROM or the like and perform vehicle brake control such as ABS control, TRC control, and vehicle velocity control.

As depicted in FIGS. 2A and 2B, the brake ECU 50 receives detection signals from wheel velocity sensors 51a to 51d and W/C pressure sensors 52a to 52d provided respectively at the wheels FL to RR to obtain various physical quantities. The brake ECU 50 obtains wheel velocity of the wheels FL to RR, vehicle velocity (estimated vehicle velocity), W/C pressures of the wheels FL to RR, and the like, based on the detection signals. The brake ECU 50 performs vehicle brake control such as ABS control, TRC control, and vehicle velocity control in accordance with the information.

For ABS control, the brake ECU 50 determines whether or not to perform control, which one of increase, keeping, and decrease of the W/C pressure of a control target wheel to be performed, and the like. For TRC control or vehicle velocity control, the brake ECU 50 determines whether or not to perform control and obtains a W/C pressure to be generated by the W/C of a control target wheel. The brake ECU 50 controls the respective control valves 20 and 30 to 33 and the motor 11 in accordance with the results. Accordingly, ABS control includes suppressing deceleration slip of a control target wheel whereas TRC control includes suppressing acceleration slip of a driving wheel as a control target wheel. Vehicle velocity control includes controlling braking force of a control target wheel so as to set vehicle velocity to a predetermined level during travel on a descending road or deceleration.

For example, in a case where the front left wheel FL is to generate a W/C pressure as a control target wheel in TRC control, the differential pressure control valve 20 is brought into the differential pressure state, the motor 11 is turned ON, and the pump 10 is driven. The braking hydraulic pressure downstream of (close to the W/C) the differential pressure control valve 20 is thus increased in accordance with the differential pressure generated at the differential pressure control valve 20. The pressure increase control valve 31 for the front right wheel FR as a noncontrol target wheel is then brought into the blocking state so as not to pressurize the W/C 5 and so as to provide no electric current to the pressure increase control valve 30 for the front left wheel FL as a control target wheel or regulate an amount of electric current to be provided (e.g. duty control). A desired W/C pressure is thus generated at the W/C 4.

The vehicular brake controller according to the present embodiment is configured as described above. Specific operation of the vehicular brake controller will be described next. This vehicular brake controller is configured to perform normal brake control as well as ABS control, TRC control, and the like. Such basic operation is performed similarly to that of a conventional device. Therefore, described herein is shift suppression control processing performed during vehicle brake control including driving the motor 11, such as ABS control, TRC control, and vehicle velocity control, relevant to the feature of the present invention.

In the present embodiment, the motor 11 is not driven continuously during vehicle brake control but the motor 11 is turned ON when necessary and turned off otherwise in order for prevention of temperature increase and improvement in durability of the motor 11. However, when the motor 11 is driven and stopped in this manner and the W/C pressure of a low-pressure-side wheel is increased in a state where there is a difference in W/C pressure between the wheels in a same system, brake fluid shifts from a high-pressure-side wheel to the low-pressure-side wheel and the W/C pressure is decreased at the high-pressure-side wheel. For example, in a case where the front left wheel FL has been already pressurized in TRC control as described above and pressurization of the front right wheel FR, which has not yet been pressurized, starts, brake fluid in the W/C 4 of the front left wheel FL can shift to the W/C 5 of the front right wheel FR to decrease the W/C pressure of the front left wheel FL. This prevents the W/C pressure of the high-pressure-side wheel from reaching a target level. Particularly when the motor 11 is turned OFF to stop the pump 10 also during vehicle brake control in order to prevent temperature increase and improve durability of the motor 11, even if the motor is turned ON for pressurization, rotational velocity of the pump 10 does not sufficiently increase immediately after the motor is turned ON and the pump 10 does not supply brake fluid necessary for increase in W/C pressure of the low-pressure-side wheel. It is thus difficult to increase the W/C pressure of the low-pressure-side wheel as well as keep the W/C pressure of the high-pressure-side wheel.

In view of this, according to the present embodiment, the shift suppression control processing is performed to suppress shift of brake fluid from the high-pressure-side wheel to the low-pressure-side wheel and suppress decrease in W/C pressure of the high-pressure-side wheel. FIG. 3A is a flowchart of the detailed shift suppression control processing. The shift suppression control processing will be described in detail below with reference to FIGS. 3A and 3B as well as FIGS. 4A, 4B, 4C, 4D, 5A, 5B, 6A, and 6B to be mentioned later.

The shift suppression control processing is performed at each predetermined control period set preliminarily when vehicle brake control including driving the motor 11 is performed. The shift suppression control processing mentioned herein is basically performed to each of the wheels FL to RR, whereas the processing is performed at one time to all the wheels FL to RR in steps 100 and 105. A W/C pressure is referred to herein with a plurality of terms, namely, a target pressure TP, a control oil pressure CP, and an actual W/C pressure WC. Assume that the target pressure TP indicates a W/C pressure as a target obtained by calculation during vehicle brake control, the control oil pressure CP indicates a W/C pressure to be actually generated at a control target wheel in accordance with the target pressure TP, and the actual W/C pressure indicates a W/C pressure actually generated in accordance with the control oil pressure.

Initially in step 100, actual W/C pressures WCFL, WCFR, WCRL, and WCRR actually generated at the wheels FL to RR are obtained and a total actual W/C pressure WCall is calculated as the total value thereof. The actual W/C pressures WCFL, WCFR, WCRL, and WCRR are obtained by input of detection signals from the W/C pressure sensors 52a to 52d.

Subsequently in step 105, target pressures TPFL, TPFR, TPRL, and TPRR of the wheels FL to RR are acquired from respective applications and a total target pressure TPall is calculated as the total value thereof. The respective applications are configured to perform ABS control, TRC control, vehicle velocity control, and the like. The target pressures TPFL, TPFR, TPRL, and TPRR set by the applications are acquired by reading the same in this step.

The flow then proceeds to step 110 and control oil pressures CP of the wheels FL to RR set at the preceding control period are updated as preceding control oil pressures MCP. Reference sign ** indicates FL, FR, RL, or RR corresponding to a control target wheel. The same applies to the following description.

The flow then proceeds to step 115 to calculate the control oil pressures CP of the wheels FL to RR at the current control period. In a regular state, target pressures TP of the wheels FL to RR according to requests from the respective applications acquired in step 105 are assumed as the control oil pressures CP of the wheels FL to RR. As to be described later, in a case where there is a difference in W/C pressure between wheels in a same system, the control oil pressure CP of the low-pressure-side wheel may be corrected and limited. In this case, the control oil pressure CP** is calculated in accordance with a method to be described later.

The flow subsequently proceeds to step 120 to perform motor output determination processing. The motor output determination processing includes determination of whether or not the motor 11 needs to be driven, performing low-pressure-side control pressure correction processing, and the like.

Figure 4A:
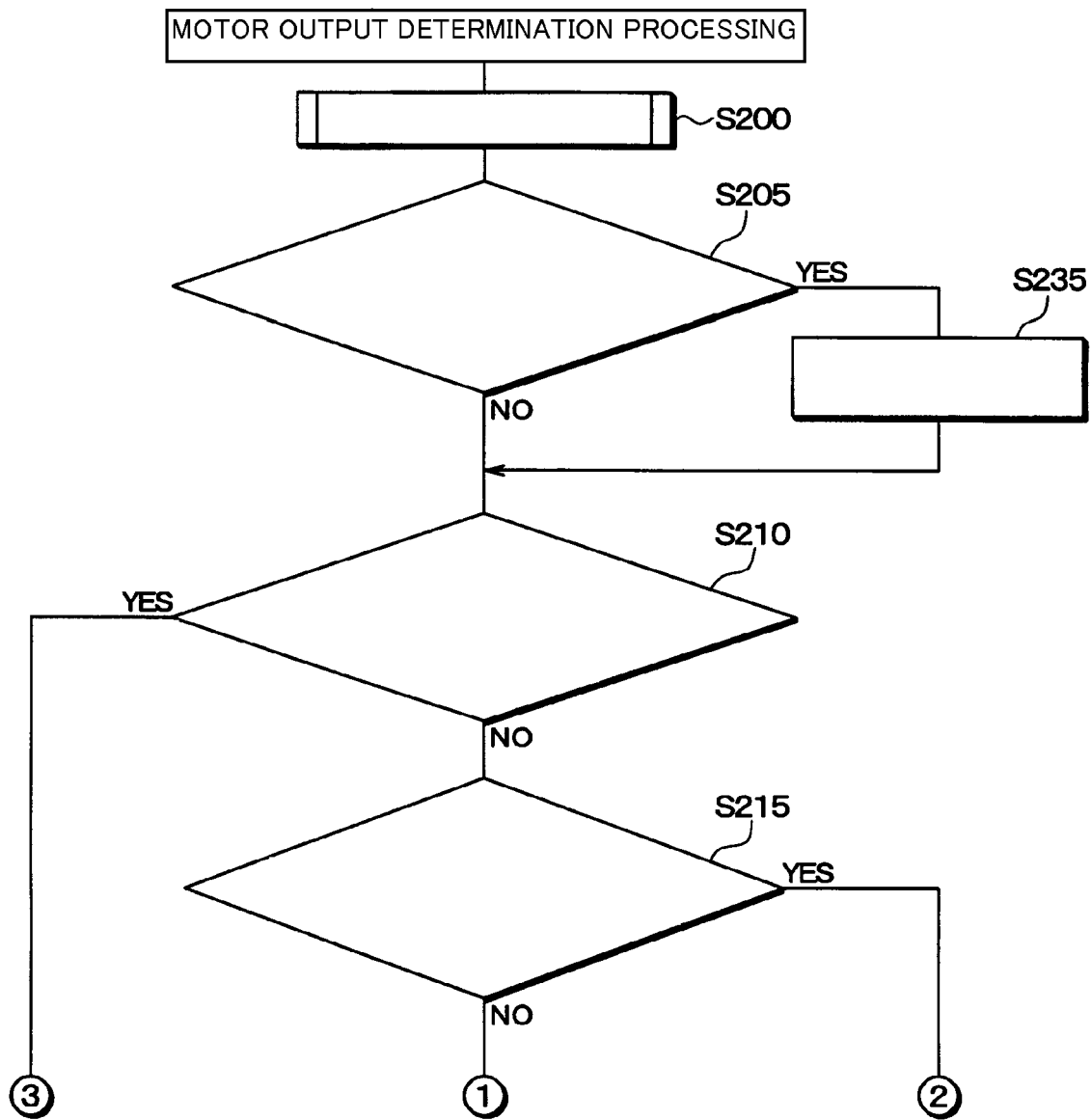
FIG. 4A is a flowchart of detailed motor output determination processing.
Figure 4C:
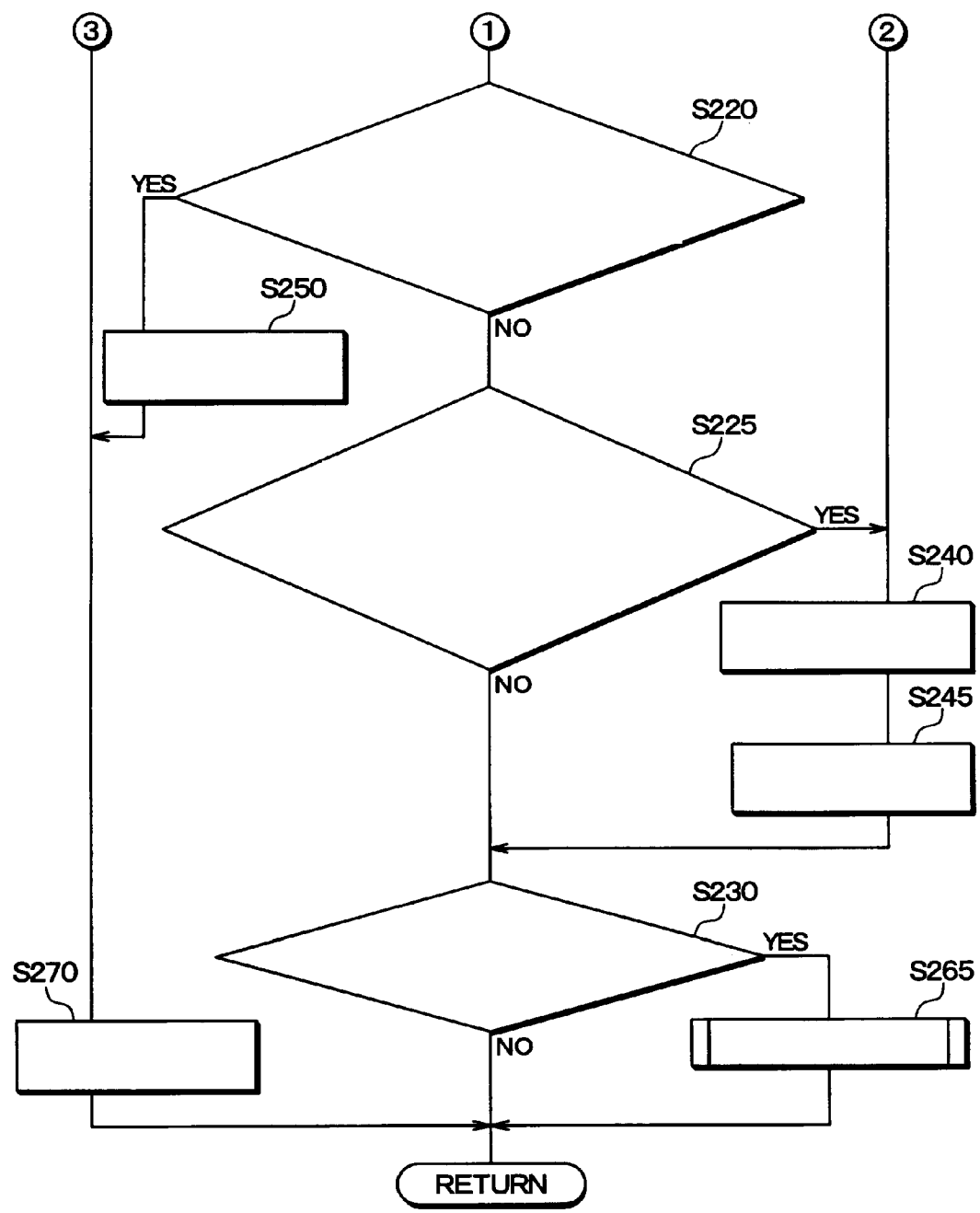
FIG. 4C is a flowchart subsequent to FIG. 4A, of the detailed motor output determination processing.

FIGS. 4A and 4C are flowcharts of the detailed motor output determination processing. As depicted in these flowcharts, high-pressure-side wheel determination processing is initially performed in step 200. The high-pressure-side wheel determination processing includes determination of whether or not a wheel corresponds to a high-pressure-side wheel out of wheels in a same system. Specifically, performed is the processing according to the flowchart of the detailed high-pressure-side wheel determination processing depicted in FIGS. 5A and 5B.

As depicted in FIGS. 5A and 5B, determined initially in step 305 is whether or not the absolute value of a difference in actual W/C pressure W/C** between an own wheel as a control target wheel and a symmetrical wheel in a same system is less than a differential pressure existing threshold KPD. The differential pressure existing threshold KPD indicates that the difference in W/C pressure has a large value in the same system enough to decrease the W/C pressure of the high-pressure-side wheel due to shift of brake fluid from the high-pressure-side wheel to the low-pressure-side wheel. If the current control target wheel corresponds to one of the front wheels FL and FR, determined is whether or not the absolute value of the difference in W/C pressure between the own wheel (one of the front wheels FL and FR) and the symmetrical wheel in the first pipe system (the other one of the front wheels FL and FR) exceeds the threshold KPD. If the current control target wheel corresponds to one of the rear wheels RL and RR, determined is whether or not the absolute value of the difference in W/C pressure between the own wheel (one of the rear wheels RL and RR) and the symmetrical wheel in the second pipe system (the other one of the rear wheels RL and RR) exceeds the threshold KPD.

If negative determination is made in step 305, the flow proceeds to step 310 to determine whether or not the actual W/C pressure WC of the own wheel is not less than the actual W/C pressure WC of the symmetrical wheel in the same system. In other words, determined is whether the own wheel corresponds to the high-pressure-side wheel or the low-pressure-side wheel in a state where brake fluid possibly shifts. If negative determination is made in step 310, the own wheel corresponds to the low-pressure-side wheel. In this case, the flow proceeds to step 315 to turn OFF a high-pressure-side wheel flag indicating the high-pressure-side wheel. If positive determination is made in step 310, the own wheel corresponds to the high-pressure-side wheel. In this case, the flow proceeds to step 320 to turn ON the high-pressure-side wheel flag.

If positive determination is made in step 305, the difference in W/C pressure between the wheels in the same system is not large enough to generate shift of brake fluid. There is thus no need to perform the low-pressure-side control pressure correction. The flow proceeds to step 320 to turn ON the high-pressure-side wheel flag regardless of whether or not the actual W/C pressure WC of the own wheel is larger than the actual W/C pressure WC of the symmetrical wheel in the same system. The high-pressure-side wheel determination processing in step 200 in FIGS. 4A and 4B finishes in this manner and the flow then proceeds to step 205.

In step 205, whether or not the actual W/C pressure WC has increased to a desired value when the actual W/C pressure WC is increased by driving the motor 11 in accordance with a request for driving the motor in the processing to be described later. As to be described later, the motor 11 stops being driven before the actual W/C pressure WC reaches the target pressure TP in order to shorten drive time of the driven motor 11. The actual W/C pressure WC is increased by means of inertia pressurization due to inertia rotation of the motor 11. Determined in step 205 is whether or not such inertia pressurization is occurring. If the target pressure TP increases during inertia pressurization, the actual W/C pressure WC may not reach the increased target pressure TP with such inertia pressurization and the motor 11 needs to be driven again. In view of this, also determined in step 205 is whether or not the target pressure TP has possibly increased during inertia pressurization. Specifically, determined is whether or not any one of the conditions is satisfied, i.e. that the actual W/C pressure WC of the own wheel is in a constant state for a certain time, that the actual W/C pressure WC is not less than the target pressure TP, and that the target pressure TP exceeds a stored target value MTP set when the motor 11 is turned OFF.

The state where the actual W/C pressure WC of the own wheel is in a constant state for a certain time indicates that inertia pressurization occurring after the motor 11 is turned OFF has stopped and the actual W/C pressure WC has become constant. Inertia pressurization is assumed to have stopped also in a case where the W/C pressure WC becomes not less than the target pressure TP. If the target pressure TP exceeds the stored target value MTP, the target pressure TP has increased from the stored target value MTP stored when the motor 11 is turned OFF during inertia pressurization. The motor 11 may be required to be driven again in this case. Accordingly, inertia pressurization is assumed as having stopped also in this case.

The flow proceeds to step 210 if negative determination is made in step 205. In contrast, the flow proceeds to step 235 if positive determination is made, to turn OFF an inertia pressurization ongoing flag and set the stored target value MTP** to 0, indicating that inertia pressurization is not ongoing.

Determined in step 210 is whether the own wheel is being depressurized or the high-pressure-side wheel flag is turned OFF and the symmetrical wheel in the same system is being depressurized. There is no need to request driving the motor 11 for the own wheel if the own wheel is being depressurized. As to be described later, while the high-pressure-side wheel is being depressurized, even if brake fluid of the high-pressure-side wheel is shifted to the low-pressure-side wheel and the W/C pressure is increased without driving the motor 11, such shift does not have much effect. The flow thus proceeds to step 215 only if negative determination is made in this step. If positive determination is made, the flow proceeds to step 270 in FIGS. 4C and 4D to turn OFF the motor request flag of each wheel MREQ** set for each of the wheels FL to RR. The processing then finishes.

Determined in step 215 is whether or not one of the conditions is satisfied, i.e. that the target pressure TP of the own wheel exceeds a value obtained by adding a predetermined value Pth1 to the actual W/C pressure WC of the own wheel and that the total target pressure TPall exceeds a value obtained by adding a predetermined value Pth2 to the total actual W/C pressure WCall.

When the target pressure TP exceeds the value obtained by adding the predetermined value Pth1 to the actual W/C pressure WC regardless of whether the control target wheel corresponds to the high-pressure-side wheel or the low-pressure-side wheel, the actual W/C pressure WC is less than the target pressure TP enough to require increase in actual W/C pressure WC. Also when the total target pressure TPall exceeds the value obtained by adding the predetermined value Pth2 to the total actual W/C pressure WCall, the total actual W/C pressure WCall of the wheels FL to RR is small enough to require increase in actual W/C pressure WC. In these cases, the actual W/C pressure WC** of the low-pressure-side wheel needs to be increased and the motor 11 needs to be driven even if shift possibly occurs.

Accordingly, the flow proceeds to step 220 in FIGS. 4C and 4D if negative determination is made in step 215. In contrast, the flow proceeds to step 240 in FIGS. 4C and 4D if positive determination is made, to turn OFF the inertia pressurization ongoing flag and set the stored target value MTP to 0, indicating that inertia pressurization is not ongoing. The flow further proceeds to step 245 to turn ON the motor request flag MREQ of each wheel set to each of the wheels FL to RR.

Determined in step 220 is whether or not motor ON time CON exceeds a temporal threshold TON, the target pressure TP of the own wheel is not more than a value obtained by adding a predetermined value Pth3 to the actual W/C pressure WC, and the total target pressure TPall is not more than a value obtained by adding a predetermined value Pth4 to the total actual W/C pressure WCall. The temporal threshold TON indicates minimum time to continuously operate the motor, and is set in consideration of protection of a relay contact for drive of the motor 11, time required for the motor 11 to reach predetermined rotational velocity, and the like. The temporal threshold TON is preferably set to be not less than time expected to take before the target pressure TP becomes not less than the predetermined value Pth3 relatively to the actual W/C pressure WC upon start of driving the motor in a case where the target pressure TP increases at least by an increase grade expected when braking force is required to increase quickly. The motor is thus to be kept ON during increase in braking force if braking force is required to increase quickly. The predetermined values Pth3 and Pth4 are thresholds referred to upon stopping the driven motor 11 before the actual W/C pressure WC reaches the target pressure TP in order to shorten drive time of the driven motor 11. If inertia rotation increases the actual W/C pressure WC to the target pressure TP by means of inertia pressurization even if the motor 11 stops being driven, the motor 11 can be stopped or drive time of the motor 11** can be shorten preferably.

If positive determination is made in step 220, the flow proceeds to step 250 to turn ON the inertia pressurization ongoing flag indicating that inertia pressurization is ongoing. Furthermore, the target pressure TP at this time point is set to the stored target value MTP. The flow then proceeds to step 270 to turn OFF the motor request flag MREQ of each wheel. The motor 11 thus stops being driven and inertia pressurization due to inertia rotation of the motor 11 increases the actual W/C pressure WC. If the target pressure TP increases after the motor 11 is turned OFF, the actual W/C pressure WC may not become not less than the target pressure TP unless the motor 11 is driven again, failing to satisfy the condition that the actual W/C pressure WC is not less than the target pressure TP. If the target pressure TP increases significantly, the motor needs to be turned ON immediately so as to cause the actual W/C pressure WC to follow the target pressure TP. In step 250, the target pressure TP is thus stored as the stored target value MTP, so that positive determination is made in step 205 when the actual W/C pressure WC becomes not less than the target pressure TP of the case where the motor 11 stops being driven due to inertia pressurization, even if the target pressure TP increases after the motor 11** stops.

In contrast, the flow proceeds to step 225 if negative determination is made in step 220. Determined in step 225 is whether or not one of the conditions is satisfied, i.e. that the target pressure TP of the own wheel exceeds the actual W/C pressure WC as well as the actual W/C pressure WC is substantially 0, and that the high-pressure-side wheel flag is ON as well as the inertia pressurization ongoing flag is OFF and the target pressure TP of the own wheel exceeds the actual W/C pressure WC. The former condition is for the case where the own wheel corresponds to the low-pressure-side wheel whereas the latter condition is for the case where the own wheel corresponds to the high-pressure-side wheel. When the actual W/C pressure WC of the low-pressure-side wheel is increased, shift of brake fluid possibly decreases the actual W/C pressure WC of the high-pressure-side wheel. If the actual W/C pressure WC of the low-pressure-side wheel is substantially 0, the actual W/C pressure WC of the low-pressure-side wheel is also preferably increased without performing the low-pressure-side control pressure correction to be described later. The actual W/C pressure WC of the high-pressure-side wheel needs to be increased if the target pressure TP is larger than the actual W/C pressure WC while inertia pressurization is not ongoing.

Accordingly, if positive determination is made in step 225, the flow proceeds to steps 240 and 250 to turn OFF the inertia pressurization ongoing flag, set the stored target value MTP to 0, and turn ON the motor request flag MREQ of each wheel. If negative determination is made in step 225, the flow proceeds to step 230 to determine whether or not the own wheel is being pressurized in the case where the high-pressure-side wheel flag is OFF, in other words, the own wheel corresponds to the low-pressure-side wheel. If positive determination is made in step 230, the flow proceeds to step 265 to perform the low-pressure-side control pressure correction. If negative determination is made, the processing finishes without performing the low-pressure-side control pressure correction even when the own wheel corresponds to the low-pressure-side wheel.

Figure 6A:
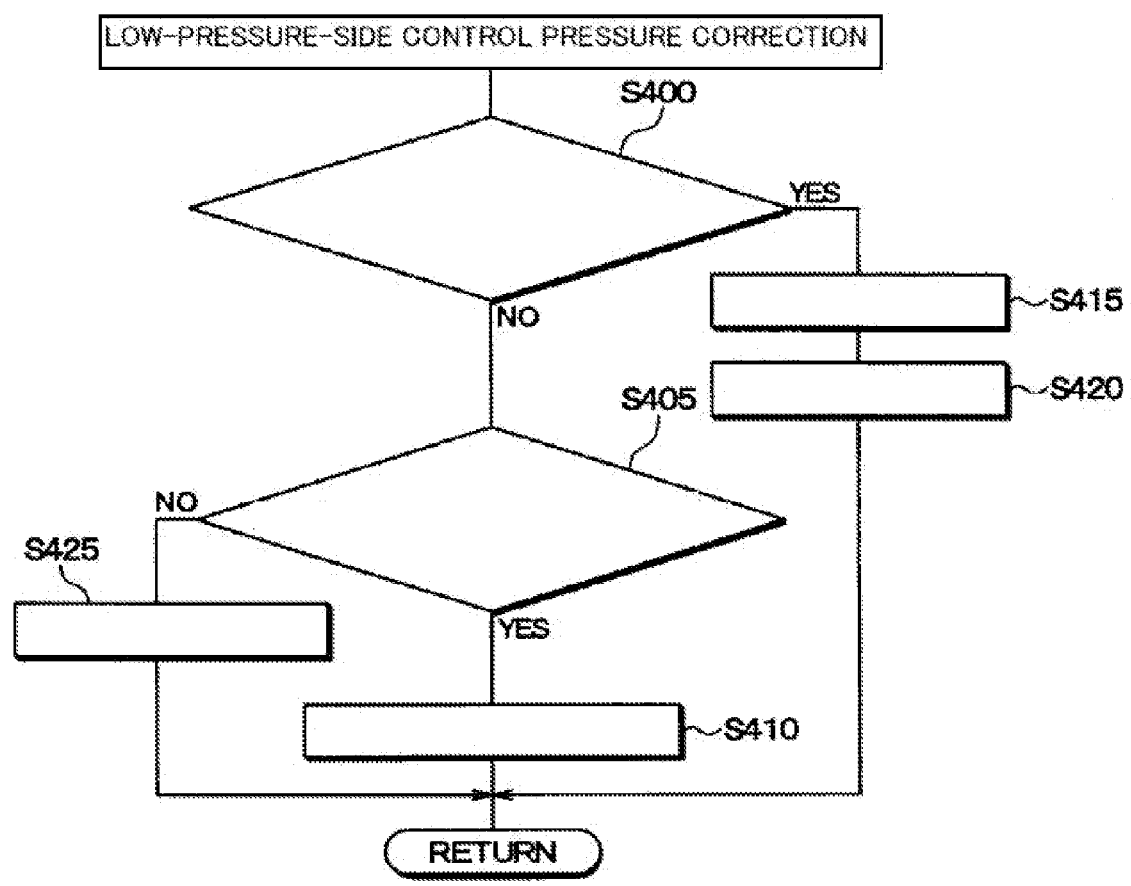
FIG. 6A is a flowchart of detailed low-pressure-side control pressure correction.

FIG. 6A is a flowchart of the detailed low-pressure-side control pressure correction performed in step 265. Even when the target pressure TP of the low-pressure-side wheel increases after the motor 11 is stopped in the state where the actual W/C pressure WC is not 0 anymore, there is no need to increase the actual W/C pressure WC if the amount of increase is small. The low-pressure-side control pressure correction includes correcting to prevent increase in control oil pressure CP of the low-pressure-side wheel in such a case, thereby preventing shift caused by pressurization of the W/C of the low-pressure-side wheel. However, if the target pressure TP increases enough to cause necessity of increasing the actual W/C pressure WC, the W/C of the low-pressure-side wheel is also to be pressurized. The control oil pressure CP is not preferred to be quickly increased to the target pressure TP from a state where the control oil pressure CP is suppressed. Furthermore, there is no need to suppress the control oil pressure CP if the motor 11 is turned ON and pressurization is ongoing from the state where the actual W/C pressure WC is 0. The control oil pressure CP is to be set correspondingly.

Specifically, initially determined in step 400 is whether or not the target pressure TP of the own wheel corresponding to the low-pressure-side wheel is not more than the value obtained by adding the predetermined value Pth1 to the actual W/C pressure WC as well as whether or not the motor 11 is OFF. In other words, determination is made as to whether or not the target pressure TP is not large enough for the motor 11** to be necessary to be turned ON.

If positive determination is made in step 400, there is no need to increase the control oil pressure CP. The flow thus proceeds to step 415 in this case to set the preceding control oil pressure MCP as the current control oil pressure CP and suppress increase in control oil pressure CP. The flow then proceeds to step 420 to turn ON the low pressure suppression storage flag indicating that the control oil pressure CP** of the low-pressure-side wheel is suppressed, and finish the processing.

In contrast, if negative determination is made in step 400, the flow proceeds to step 405 to determine whether or not the target oil pressure TP exceeds a value obtained by adding, to the preceding control oil pressure MCP, a predetermined pressure increase amount Ups1 corresponding to one calculation period of an increase grade limit of the control oil pressure CP as well as the low pressure suppression storage flag is turned ON. The control oil pressure CP is not preferred to be quickly increased to the target pressure TP from a state where the control oil pressure CP is suppressed if the target pressure TP is increased enough to cause necessity of increasing the actual W/C pressure WC. For example, braking force increased quickly may cause more sudden behavior of the vehicle than behavior in the regular state. In view of this, if positive determination is made, the flow proceeds to step 410 to limit the control oil pressure CP to be currently set to the value obtained by adding, to the preceding control oil pressure MCP, the predetermined pressure increase amount Ups1. If negative determination is made in step 405, the flow proceeds to step 425 to turn OFF the low pressure suppression storage flag and finish the processing. The low-pressure-side control pressure correction finishes in this manner to complete the motor output determination processing depicted in FIGS. 4A, 4B, 4C and 4D.

The flow then proceeds to step 125 in FIGS. 3A and 3B to determine whether or not the motor request flags MREQ of all the wheels FL to RR are turned OFF. If positive determination is made, the flow proceeds to step 130 to turn OFF the motor. In this case, the motor 11 stops being driven and a motor ON period timer CON, which is configured to measure drive time of the motor 11, is cleared. If the motor request flag MREQ is ON for any one of the wheels and negative determination is made in step 125, the flow proceeds to step 140 to turn ON the motor. In this case, the motor 11 is driven and the motor ON period timer CON, which is configured to measure drive time of the motor 11, is incremented.

The flow subsequently proceeds to step 150 to output to solenoids of the differential pressure control valve 20 and the pressure increase control valves 30 and 31 of the wheels FL to RR. The differential pressure control valve 20 and the pressure increase control valves 30 and 31 are thus controlled to cause the actual W/C pressure WC of the wheel as a control target wheel to reach the control oil pressure CP in accordance with vehicle brake control.

Figure 7:
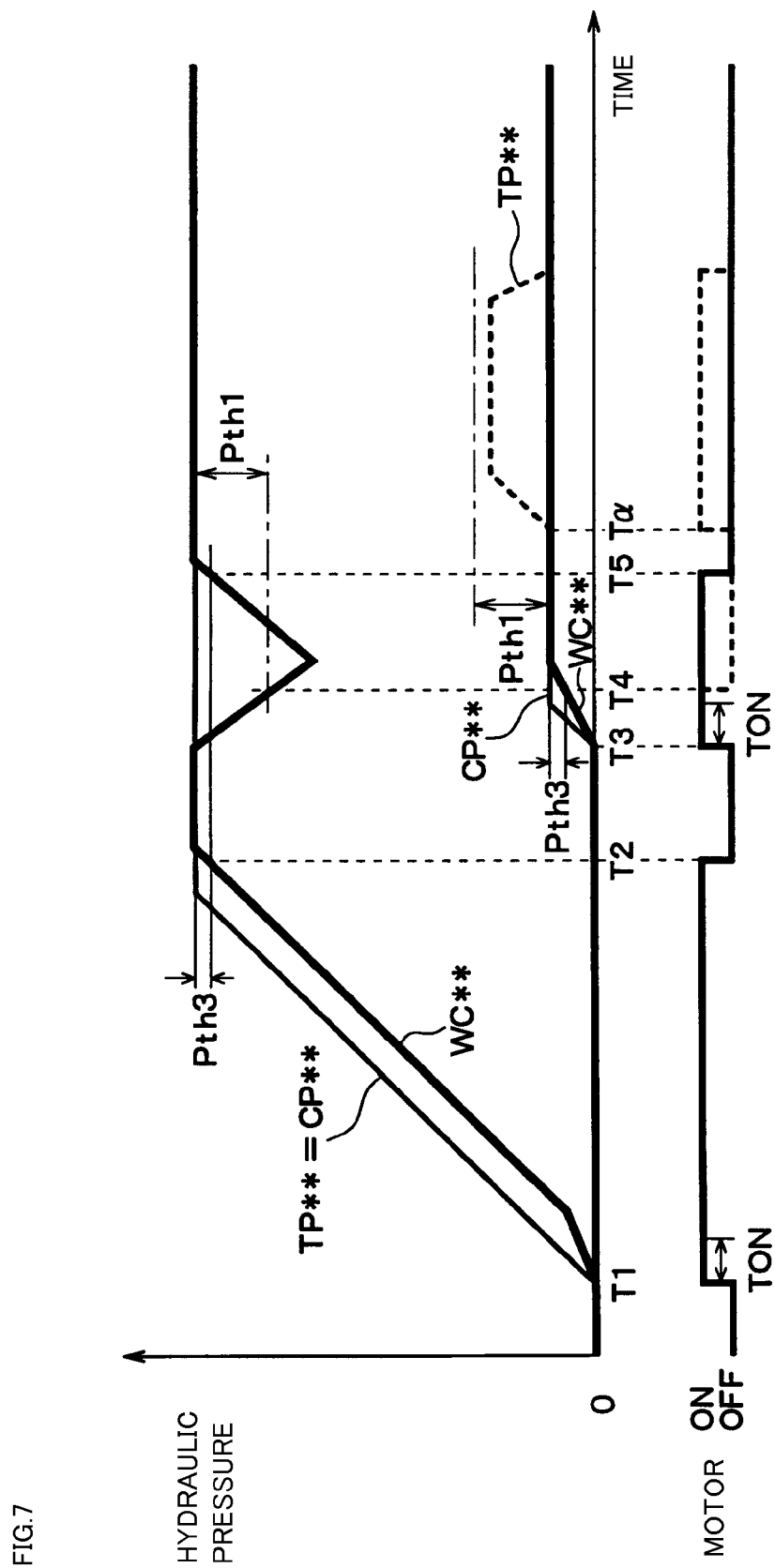
FIG. 7 is a timing chart of relations between target pressures, control oil pressures, and actual W/C pressures of a high-pressure-side wheel and a low-pressure-side wheel, and ON-OFF states of a motor 11.
Figure 8:
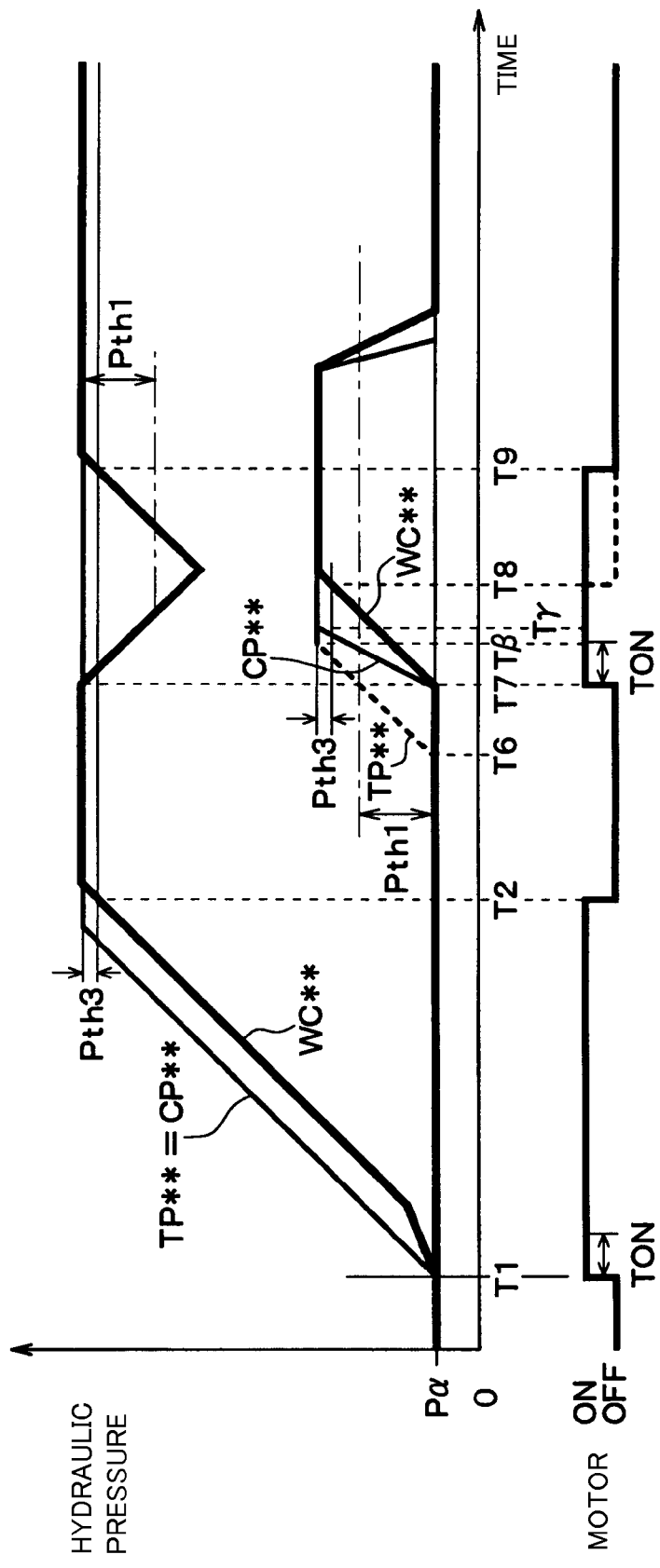
FIG. 8 is a timing chart of relations between the target pressures, the control oil pressures, and the actual W/C pressures of the high-pressure-side wheel and the low-pressure-side wheel, and the ON-OFF states of the motor 11.
Figure 9:
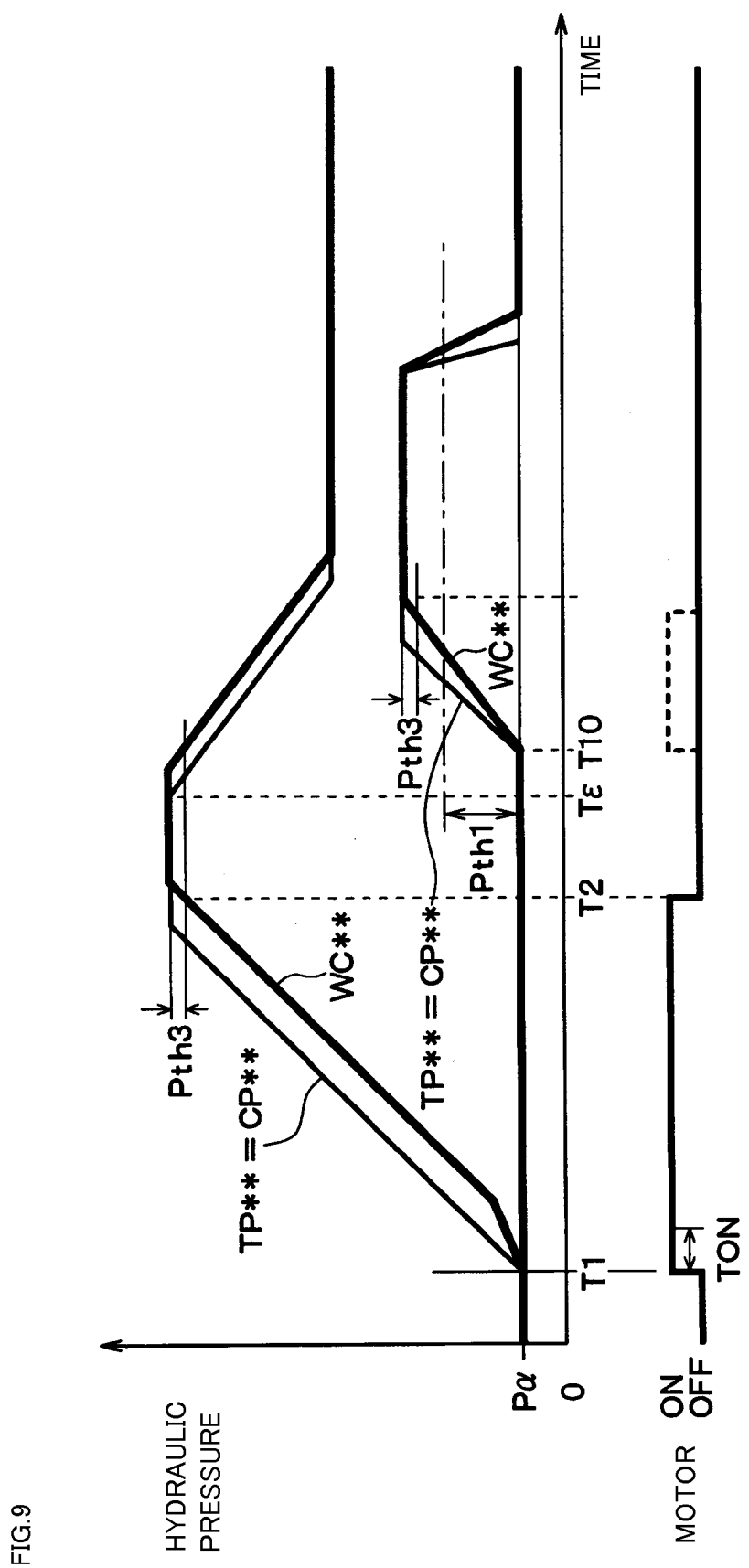
FIG. 9 is a timing chart of relations between the target pressures, the control oil pressures, and the actual W/C pressures of the high-pressure-side wheel and the low-pressure-side wheel, and the ON-OFF states of the motor 11.

The shift suppression control processing is performed as described above. FIGS. 7 to 9 are timing charts of relations between the target pressures TP, the control oil pressures CP, and the actual W/C pressures WC** of the high-pressure-side wheel and the low-pressure-side wheel, and the ON-OFF states of the motor 11, in a case where TRC control is performed as vehicle brake control. Operation at each timing during the shift suppression control processing will be described with reference to these charts, along with the flows in the flowcharts depicted in FIGS. 3A to 6A.

FIG. 7 indicates a case where the difference in W/C pressure between the high-pressure-side wheel and the low-pressure-side wheel is larger than the threshold and the amount of increase in target value TP after the actual W/C pressure WC of the low-pressure-side wheel is increased is smaller than the predetermined value Pth1.

Until a time point T1 prior to brake control, neither the high-pressure-side wheel nor the low-pressure-side wheel is pressurized or depressurized and the actual W/C pressure WC is constantly 0 for at least a certain time, with the target pressure TP being 0 and the stored target value MTP not being set. The respective flags are OFF and the motor ON time CON is 0. The flow thus proceeds to steps 205, 235, 210, 215, 220, 225, and 230, and a motor OFF request is continuously issued in accordance with the fact that the motor request flag MREQ of each wheel is turned OFF finally at the preceding brake control. At this time point, the relation TP≤WC+Pth3 is established in step 220. However, negative determination is made in this step because the motor ON time CON is not more than the temporal threshold TON.

The target pressure TP of the high-pressure-side wheel then increases at the time point T1. The actual W/C pressure WC is neither constant for a certain time nor is not less than the target pressure TP in step 205. The flow still proceeds to steps 200, 235, 210, 215, and 220 in the mentioned order, similarly to up to the time point T1, until the motor ON time CON exceeds the temporal threshold TON because the stored target value MTP has not yet been set. The difference in actual W/C pressure WC between the high-pressure-side wheel and the low-pressure-side wheel is less than the threshold KPD at the initial stage of brake control. In this state, distinction between the high-pressure-side wheel and the low-pressure-side wheel is not made in the high-pressure-side wheel determination processing in step 200, and the high-pressure-side wheel flag is ON (see steps 305 and 320). Each of the relations are established and positive determination is made in step 225, and the flow proceeds to steps 240 and 245 to turn ON the motor request flag MREQ of each wheel. The flow then proceeds to step 230 to finish the processing. The motor OFF request is switched to a motor ON request and the motor 11 starts being driven.

If the motor ON time CON subsequently exceeds the temporal threshold TON, the relation TP≥WC+Pth3 is established and negative determination is to be made in step 220. The flow described above is thus kept continuously until a time point T2 indicated in FIG. 7.

The relation TP≤WC+Pth3 is established at the time point T2. The flow proceeds to steps 205, 235, 210, and 215 and positive determination is then made in step 220. The flow thus proceeds to step 250 to turn ON the inertia pressurization ongoing flag and set the stored target value MTP to the target value TP. The flow proceeds further to step 270 to turn OFF the motor request flag MREQ of each wheel and finish the processing. The motor OFF request is thus issued to stop driving the motor 11. In this manner, drive time of the motor 11 can be shortened further by increasing the actual W/C pressure WC to the target pressure TP by means of inertia pressurization in accordance with inertia rotation of the motor 11 even before the actual W/C pressure WC reaches the target pressure TP**. It is thus possible to prevent temperature increase and improve durability of the motor 11.

From the next calculation period after the time point T2, the relation TP=MTP is established because the stored target value MTP is set as the target pressure TP. The actual W/C pressure WC has not yet reached the target pressure TP and is less than the target pressure TP. Negative determination is thus made in step 205 and the flow does not proceed to step 235 but proceeds to steps 210 and 215. Negative determination is made in step 220 because the motor 11 stops being driven and the motor ON time CON becomes 0, and the flow proceeds to step 225. In step 225, the relation target pressure TP>actual W/C pressure WC** is established but negative determination is made because the inertia pressurization ongoing flag is turned ON.

The flow thus proceeds to step 230. The processing then finishes with the motor OFF request being kept continuously.

When the actual W/C pressure WC subsequently reaches the target pressure TP or the stored target value MTP, positive determination is made in step 205. The flow proceeds to step 235 and the inertia pressurization ongoing flag is turned OFF in step 235. The flow then proceeds to steps 210, 215, 220, and 225. Negative determination is made in step 225 because the actual W/C pressure WC is not less than the target pressure TP** although the inertia pressurization ongoing flag is OFF. The flow thus proceeds to step 230 to finish the processing. The motor OFF request is kept accordingly.

When the target pressure TP of the low-pressure-side wheel subsequently increases at a time point T3, the flow proceeds to steps 205, 235, 210, 215, and 220 as to the low-pressure-side wheel, similarly to the case where the high-pressure-side wheel starts being pressurized. The relation target pressure TP>actual W/C pressure WC is established, the actual W/C pressure WC becomes substantially 0, and positive determination is made in step 225. The flow then proceeds to steps 240 and 245. The motor request flag MREQ of each wheel us turned ON in step 245. The flow then proceeds to steps 230 and 265. In the low-pressure-side control pressure correction, negative determination is made in step 400 because the motor request flag MREQ of each wheel is ON. The flow proceeds to step 405. When the low-pressure-side control pressure correction is performed for the first time, positive determination is made because the low pressure suppression storage flag is OFF. The flow thus proceeds to step 425 to finish the processing. If pressurization of the low-pressure-side wheel is requested from the state where the actual W/C pressure WC is 0, the motor 11 starts being driven with no limit to the control oil pressure CP. Pressure increase is thus made quickly. The low-pressure-side wheel is kept in this state until a time point T4.

The actual W/C pressure WC of the high-pressure-side wheel is decreased by shift of brake fluid from the high-pressure-side wheel due to pressurization of the low-pressure-side wheel. The flow thus proceeds to steps 205, 235, 210, 215, and 220 and then proceeds to step 225 as to the high-pressure-side wheel. The relation target pressure TP>actual W/C pressure WC is established due to decrease in actual W/C pressure WC, and positive determination is made in step 225. The flow subsequently proceeds to steps 240, 245, and 230 to finish the processing. The motor ON request is accordingly issued to restore the decreased actual W/C pressure WC** of the high-pressure-side wheel.

Subsequently at the time point T4, the relation TP≤WC+Pth3 is established as to the low-pressure-side wheel. The flow proceeds to steps 205, 235, 210, and 215 and positive determination is then made in step 220. The flow thus proceeds to step 250 to turn ON the inertia pressurization ongoing flag and set the stored target value MTP to the target value TP. The flow proceeds further to step 270 to turn OFF the motor request flag MREQ** of each wheel and finish the processing. The motor OFF request is issued accordingly.

The relation target pressure TP>actual W/C pressure WC is established continuously as to the high-pressure-side wheel. The flow proceeds to steps 205, 235, 210, 215, 220, 225, 240, 245, and 230 in the mentioned order to finish the processing. Alternatively, if the relation target pressure TP>actual W/C pressure WC+Pth1 is established due to further decrease in actual W/C pressure WC of the high-pressure-side wheel, the flow proceeds to steps 205, 235, 210, 215, 240, 245, and 230 in the mentioned order to finish the processing. The motor request flag MREQ of each wheel is turned ON and the motor ON request is issued as to the high-pressure-side wheel in both of these cases. Therefore, negative determination is made in step 125 in FIGS. 3A and 3B even if the motor OFF request is issued as to the low-pressure-side wheel. The motor is thus kept ON continuously.

When the actual W/C pressure WC of the low-pressure-side wheel subsequently reaches the target pressure TP, the flow proceeds to steps 205, 235, 210, 215, 220, 225, and 230 in the mentioned order as to the low-pressure-side wheel to finish the processing. The motor OFF request is kept continuously. However, in the example shown in FIG. 7, also in this case, the motor ON request is issued as to the high-pressure-side wheel and the motor is kept ON continuously.

Subsequently at a time point T5, the relation target pressure TP≤actual W/C pressure WC+Pth3 is established as to the high-pressure-side wheel. The flow thus proceeds to steps 205, 235, 210, 215, 220, 250, and 270 to finish the processing. The request is switched to the motor OFF request also as to the high-pressure-side wheel, so that the motor OFF request is issued as to each of the high-pressure-side wheel and the low-pressure-side wheel. The motor is thus turned OFF. In other words, the motor is kept ON continuously until the actual W/C pressure WC of the high-pressure-side wheel is assumed to be reliably restored to the target pressure TP, and the motor is thereafter turned OFF. This prevents temperature increase and improves durability of the motor 11.

When the actual W/C pressure WC of the high-pressure-side wheel is restored to the target pressure TP, the flow proceeds to steps 205, 235, 210, 215, 220, 225, and 230 to finish the processing. The motor OFF request is thus kept continuously.

Assume that he target pressure TP of the low-pressure-side wheel is increased by a request from the application at a time point Tα, with the amount of increase being not more than the predetermined value Pth1. In this case, the target pressure TP of the low-pressure-side wheel is increased to establish the relation target pressure TP>actual W/C pressure WC. Even if the flow proceeds to steps 205, 235, 210, 215, and 220, negative determination is made in step 225 because the relation actual W/C pressure WC≈0 is not established. The flow thus proceeds to steps 230 and 265. In the low-pressure-side control pressure correction, positive determination is made in step 400 because the motor OFF request is kept continuously. The control oil pressure CP is kept at the preceding value and the relation control oil pressure CP=actual W/C pressure WC is established in step 415. The pressure increase control valves 30 and 31 are kept in the blocking state upon output to the solenoids in step 150 in FIGS. 3A and 3B. The flow proceeds to step 420 to finish the processing. Accordingly, the motor is turned OFF and the pressure increase control valves 30 and 31 of the low-pressure-side wheel come into the blocking state, to prevent pressure decrease due to shift of brake fluid from the high-pressure-side wheel.

As described above, even if the condition for start of TRC control is satisfied and the target pressure TP is set as to the low-pressure-side wheel, the control oil pressure CP is not increased unless the target pressure TP exceeds the value obtained by adding the predetermined value Pth1 to the actual W/C pressure WC. It is thus possible to prevent shift of brake fluid from the high-pressure-side wheel to the low-pressure-side wheel. The actual W/C pressure WC** of the high-pressure-side wheel is relatively high also in this case. It is thus possible to obtain desired braking force with the high-pressure-side wheel.

FIG. 8 indicates a case where the difference in W/C pressure between the high-pressure-side wheel and the low-pressure-side wheel increases to be larger than the threshold from the state kept at a predetermined pressure Pα and the amount of increase in target value TP** after the W/C pressure of the low-pressure-side wheel is increased is to be larger than the predetermined value Pth1.

Transition from the time point T1 to a time point T6 through the time point T2 is similar to that indicated in FIG. 7. The relation target pressure TP of low-pressure-side wheel>actual W/C pressure WC is established at the time point T6 in the state same as that at the time point Tα in FIG. 7. However, neither the relation target pressure TP>actual W/C pressure WC+Pth1 nor the relation actual W/C pressure WC≈0 is established. The flow thus proceeds to steps 205, 235, 210, 215, 220, 225, 230, and 265. At this time point, in the low-pressure-side control pressure correction in step 265, positive determination is made in step 400 because the motor OFF request is kept continuously. The control oil pressure CP is set to the preceding control oil pressure MCP in step 415 to keep the control oil pressure CP and the actual W/C pressure WC** equal to each other. The pressure increase control valves 30 and 31 of the low-pressure-side wheel are kept in the blocking state upon output to the solenoids in step 150 in FIGS. 3A and 3B. Accordingly, the motor is turned OFF and the pressure increase control valves 30 and 31 of the low-pressure-side wheel come into the blocking state, to prevent pressure decrease due to shift of brake fluid from the high-pressure-side wheel.

The relation target pressure TP>actual W/C pressure WC+Pth1 is established as to the low-pressure-side wheel subsequently at a time point T7. The flow thus proceeds to steps 205, 235, 210, 215, 240, and 245. The motor request flag MREQ of each wheel is turned ON to issue the motor ON request. The flow then proceeds to steps 230 and 265. The motor ON request is issued and the relation target pressure TP>actual W/C pressure WC+Pth1 is established in the low-pressure-side control pressure correction. Negative determination is accordingly made in step 400 and the flow proceeds to step 405. The low pressure suppression storage flag is ON in step 405 as described above. The value obtained by adding the predetermined pressure increase amount Ups1 to the preceding control oil pressure MCP is compared with the control oil pressure CP having the target pressure TP substituted in step 115. Positive determination is to be made because the value having, as a reference, the preceding control oil pressure MCP with the increase grade limit being applied thereto is smaller until the control oil pressure CP reaches the target pressure TP. The flow then proceeds to step 410 to update the control oil pressure CP to the preceding control oil pressure MCP with the increase grade limit being applied thereto+UPs1. The control oil pressure CP is thus prevented from changing quickly toward the target pressure TP** to finish the processing.

Meanwhile, the actual W/C pressure WC of the high-pressure-side wheel is decreased similarly to the case indicated in FIG. 7 due to started pressurization of the low-pressure-side wheel. The flow thus proceeds to steps 205, 235, 210, 215, 220, 225, 240, 245, and 230 in the mentioned order to finish the processing. Alternatively, if the relation target pressure TP>actual W/C pressure WC+Pth1 is established due to further decrease in actual W/C pressure WC of the high-pressure-side wheel, the flow proceeds to steps 205, 235, 210, 215, 240, 245, and 230 in the mentioned order to finish the processing. The motor request flag MREQ** of each wheel is turned ON and the motor ON request is issued as to the high-pressure-side wheel in both of these cases. Since the motor ON request is issued in each of the cases, negative determination is made in step 125 in FIGS. 3A and 3B and the motor is to be kept ON continuously.

The actual W/C pressure WC of the low-pressure-side wheel increases at a time point Tβ to decrease the difference from the target pressure TP and the relation target pressure TP>actual W/C pressure WC+Pth1 is not established in this case. The flow still proceeds to steps 205, 235, 210, 215, 220, 225, 230, and 265 in the mentioned order. Because the motor ON request is issued continuously, negative determination is made in step 400 due to the motor ON request in the low-pressure-side control pressure correction in step 265. The flow proceeds to steps 405 and 410 in the mentioned order to finish the processing. Accordingly, the motor ON request and the increase grade limit to the control oil pressure CP** are kept continuously as to the low-pressure-side wheel.

The control oil pressure CP, which is obtained by applying the increase grade limit to the preceding value as a reference, reaches TP at a time point Tγ. The flow proceeds to steps 205, 235, 210, 215, 220, 225, 230, and 265 in the mentioned order as to the low-pressure-side wheel. Because the motor ON request is kept continuously, negative determination is made in step 400 in the low-pressure-side control pressure correction in step 265, the relation control oil pressure CP>preceding control oil pressure MCP+ Ups1 is not established and negative determination is made in step 405. The flow proceeds to step 425 to finish the processing. There is thus no further increase grade limit to the control oil pressure CP, but the control oil pressure CP calculated in step 115, or the target pressure TP corresponds to the control oil pressure CP.

The relation target pressure TP≤actual W/C pressure WC+Pth3 is established as to the low-pressure-side wheel at a time point T8. The flow proceeds to steps 205, 235, 210, and 215, and positive determination is made in step 220. The flow then proceeds to steps 250 and 270 to finish the processing. The motor request flag MREQ** of each wheel is thus turned OFF to issue the motor OFF request.

The actual W/C pressure WC of the high-pressure-side wheel decreases continuously due to shift of brake fluid. The flow thus proceeds to steps 205, 235, 210, 215, 220, 225, 240, 245, and 230 in the mentioned order to finish the processing. Alternatively, if the relation target pressure TP>actual W/C pressure WC+Pth1 is established due to further decrease in actual W/C pressure WC of the high-pressure-side wheel, the flow proceeds to steps 205, 235, 210, 215, 240, 245, and 230 in the mentioned order to finish the processing. The motor request flag MREQ** of each wheel is turned ON and the motor ON request is issued as to the high-pressure-side wheel in both of these cases. Negative determination is made in step 125 in FIGS. 3A and 3B even if the motor OFF request is issued as to the low-pressure-side wheel. The motor is thus kept ON continuously.

Furthermore, the relation target pressure TP≤actual W/C pressure WC+Pth3 is established as to the high-pressure-side wheel at a time point T9. The flow thus proceeds to steps 205, 235, 210, 215, 220, 250, and 270 to finish the processing. The request is switched to the motor OFF request also as to the high-pressure-side wheel, so that the motor OFF request is issued as to each of the high-pressure-side wheel and the low-pressure-side wheel. The motor is thus turned OFF. In other words, the motor is kept ON continuously until the actual W/C pressure WC of the high-pressure-side wheel is assumed to be reliably restored to the target pressure TP, and the motor is thereafter turned OFF. This prevents temperature increase and improves durability of the motor 11.

When the actual W/C pressure WC of the high-pressure-side wheel is restored to the target pressure TP, the flow proceeds to steps 205, 235, 210, 215, 220, 225, and 230 to finish the processing. The motor OFF request is thus kept continuously.

As described above, if the target pressure TP of the low-pressure-side wheel exceeds the value obtained by adding the predetermined value Pth1 to the actual W/C pressure WC, the control oil pressure CP starts being generated upon the excess. The desired actual W/C pressure WC is generated and braking force is generated also at the low-pressure-side wheel. In this case, the control pressure is not increased quickly but the low-pressure-side control pressure correction is performed so as to gradually increase the control pressure to the target pressure TP**. This suppresses increase in hydraulic pressure variation and prevents the effect on vehicle behavior. The actual W/C pressure of the high-pressure-side wheel can be prevented from being kept decreased by driving the motor 11 in this case and turning OFF the motor 11 even when necessary. It is thus possible to generate desired braking force.

FIG. 9 indicates a case where the low-pressure-side wheel satisfies the condition for start of TRC control to increase the W/C pressure while the W/C pressure of the high-pressure-side wheel is being decreased.

Transition from the time point T1 to a time point Tε through the time point T2 is similar to that indicated in FIG. 7. The relation target pressure TP<actual W/C pressure WC is established as to the high-pressure-side wheel at the time point Tε and the high-pressure-side wheel becomes being depressurized. The flow thus proceeds to steps 205, 235, 210, and 270 in the mentioned order. The motor OFF request is thus kept continuously.

Because the high-pressure-side wheel is being depressurized, the flow as to the low-pressure-side wheel also proceeds to steps 205 and 235. Positive determination is subsequently made in step 210, and the flow proceeds to step 270. The motor OFF request is thus kept continuously.

At a time point T10, the high-pressure-side wheel is continuously being depressurized. Accordingly, the motor OFF request is kept continuously as in the above case. The relation target pressure TP>actual W/C pressure WC is established as to the low-pressure-side wheel that becomes being pressurized, whereas the high-pressure-side wheel is being depressurized. Positive determination is thus made in step 210 and the flow proceeds to step 270. In this case, the motor OFF request is kept continuously and the low-pressure-side control pressure correction is not to be performed.

As described above, if the low-pressure-side wheel satisfies the condition for start of TRC control and the target pressure TP is set, when the actual W/C pressure WC of the high-pressure-side wheel is being depressurized, the actual W/C pressure WC of the low-pressure-side wheel is increased with the motor 11 being kept OFF. Accordingly, brake fluid of the high-pressure-side wheel is shifted to the low-pressure-side wheel to increase the actual W/C pressure WC of the low-pressure-side wheel. The high-pressure-side wheel is being depressurized in this case, so that possible shift has only a small effect.

As described above, when the motor 11 starts being driven and the W/C of the low-pressure-side wheel is pressurized, the motor 11 is driven continuously until the actual W/C pressure WC of the high-pressure-side wheel in the same system falls in the predetermined range relative to the target pressure TP. Specifically, if the target pressure TP of the low-pressure-side wheel is larger than the value obtained by adding the predetermined value Pth1 to the actual W/C pressure WC, the control oil pressure CP of the low-pressure-side wheel is increased and the motor 11 is driven. The motor 11 is kept driven until the actual W/C pressure WC of the high-pressure-side wheel is restored in consideration of decrease in actual W/C pressure WC of the high-pressure-side wheel, and the motor 11 is turned OFF after restoration. In this configuration, by shortening drive time of the motor 11 as much as possible, prevention of temperature increase and improvement in durability of the motor 11 can be achieved and the actual W/C pressure WC of the high-pressure-side wheel having been decreased by the shift can be restored appropriately. It is thus possible to suppress the effect of the decrease in actual W/C pressure WC** of the high-pressure-side wheel due to the shift.

In a case where the difference in W/C pressure between the high-pressure-side wheel and the low-pressure-side wheel is larger than the threshold KPD assumed to generate shift, increase in control oil pressure CP of the low-pressure-side wheel is stopped if the target pressure TP of the low-pressure-side wheel is less than the value obtained by adding the predetermined value Pth1 to the actual W/C pressure WC. This suppresses shift and suppresses decrease in actual W/C pressure WC of the high-pressure-side wheel.

The target pressure TP is obtained constantly, and the motor 11 is turned ON if the difference from the actual W/C pressure WC increases. Drive time of the motor 11 can be shortened as much as possible and the W/C pressure of each wheel can be controlled appropriately in order for prevention of temperature increase and improvement in durability of the motor 11.

Other Embodiment

The present invention is not limited to the embodiment described above but can be modified appropriately within the scope of the claims.

For example, the actual W/C pressures are detected directly by the W/C pressure sensors 52a to 52d in the above embodiment. The W/C pressures can be alternatively estimated through calculation. Specifically, for ABS control, TRC control, and vehicle velocity control, the actual W/C pressures can be estimated from rotational velocity of the motor 11 and drive time of the pressure increase control valves 30 and 31 and the pressure decrease control valves 32 and 33 with the M/C pressures generated in the M/Cs 3 as references. These estimated actual W/C pressures can replace detection values obtained from detection signals of the W/C pressure sensors 52a to 52d. In this case, the W/C pressure does not increase to be not less than the value obtained by adding the differential pressure by the differential pressure control valve 20 to the M/C pressure. The upper limit guard is applied to the value obtained by adding the differential pressure by the differential pressure control valve 20 to the M/C pressure. When the difference in W/C pressure between the high-pressure-side wheel and the low-pressure-side wheel is larger than the threshold and shift is assumed to occur due to increase in W/C pressure of the low-pressure-side wheel, the estimated value of the actual W/C pressure of the high-pressure-side wheel is decreased by the shifted pressure. For estimation of the actual W/C pressure, W/C pressure increase and decrease grades can be obtained through an experiment. It is preferred to correct the grades in accordance with motor rotational velocity or correct the W/C pressure increase grade if the W/C pressures of the wheels in the same system are increased.

The predetermined values Pth3 and Pth4 can be set to constant values, or can be variable in accordance with the W/C pressures of the wheels in each system because the amount of pressurization due to inertia of the motor 11 varies in accordance with the generated W/C pressures of the wheel in the system.

According to the above embodiment, determined in step 200 is whether or not a shift state for possibly generating shift is established, thereby determining whether or not the target value of the low-pressure-side wheel exceeds the predetermined value Pth1 in the shift state. However, whether or not the shift state is established is determined optionally. Alternatively, this determination may be replaced with determination of whether or not the target value of the low-pressure-side wheel exceeds the predetermined value Pth1.

According to the above embodiment, performed in steps 215 and 220 are comparison between the actual W/C pressure WC of each wheel and the target pressure TP as well as comparison between the total actual W/C pressure WCall and the total target pressure TPall. These steps can alternatively include only the comparison between the actual W/C pressure WC of each wheel and the target pressure TP.

According to the above embodiment, turning ON the motor is requested immediately for pressurization if the high-pressure-side wheel establishes the relation target pressure TP>actual W/C pressure WC. Alternatively, a predetermined deviation Pths can be set to be less than the predetermined value Pth1, and turning ON the motor can be requested for pressurization after the target pressure TP becomes larger than the actual W/C pressure WC at least by the predetermined deviation Pths. The predetermined deviation Pths can be set such that slight increase in target pressure TP** not influencing vehicle behavior will not generate pressurization control too frequently, in accordance with an experiment result or the like.

In the above embodiment, the brake ECU 50 corresponds to the hydraulic pressure control means according to the present invention, and the steps depicted in the figures correspond to means configured to perform various processing. For example, the portion configured to perform the processing in step 100 corresponds to an actual pressure obtaining means, the portion configured to perform the processing in step 105 corresponds to a target pressure acquiring means, and the portion configured to perform the processing in step 200 corresponds to a shift determination means.

REFERENCE SIGNS LIST

1 Brake pedal
3 M/C
10 Pump
11 Motor
20 Differential pressure control valve
30, 31 Pressure increase control valve
32, 33 Pressure decrease control valve
40 Pressure regulating valve
50 Brake ECU
51a to 51d Wheel velocity sensor
52a to 52d W/C pressure sensor

The invention claimed is:

1. A vehicular brake controller including a motor, a pump configured to be driven by the motor to suck and discharge brake fluid, a plurality of wheel cylinders connected to a discharge end of the pump by way of control valves, and a hydraulic pressure control means configured to control a braking hydraulic pressure generated at each of the wheel cylinders by controlling the motor and the control valves, wherein the hydraulic pressure control means includes a target pressure acquiring means configured to acquire a target pressure being a target value of a hydraulic pressure applied to each of the wheel cylinders by vehicle brake control, and an actual pressure obtaining means configured to obtain an actual wheel-cylinder pressure actually generated at each of the wheel cylinders, and, when the motor starts being driven to pressurize the wheel cylinder of a low-pressure-side wheel having the actual wheel-cylinder pressure lower than the actual wheel-cylinder pressure of any other of the wheel cylinders in a same system, performs hydraulic pressure restoration control of continuously driving the motor until the actual wheel-cylinder pressure of a high-pressure-side wheel having the actual wheel-cylinder pressure higher than the actual wheel-cylinder pressure of any other of the wheel cylinders in the same system falls in a predetermined range relative to the target pressure of the wheel, and performs shift suppression control of stopping pressurization of the wheel cylinder of the low-pressure-side wheel and turning OFF the motor when a difference between the target pressure and the actual wheel-cylinder pressure of the low-pressure-side wheel is less than a predetermined value.

2. The vehicular brake controller according to claim 1, wherein the hydraulic pressure control means includes a shift determination means configured to determine, in accordance with a difference in wheel-cylinder pressure of the wheel cylinders, that shift of brake fluid from the high-pressure-side wheel to the low-pressure-side wheel possibly occurs, and performs at least one of the hydraulic pressure restoration control and the shift suppression control when the shift determination means determines that the shift possibly occurs.

3. The vehicular brake controller according to claim 2, wherein the hydraulic pressure control means does not perform the shift suppression control when the actual wheel-cylinder pressure of the low-pressure-side wheel is 0 MPa.

4. The vehicular brake controller according to claim 1, wherein, when the difference between the target pressure and the actual wheel-cylinder pressure of the low-pressure-side wheel exceeds the predetermined value, the hydraulic pressure control means sets a control oil pressure of not more than a predetermined pressurization grade in accordance with the target pressure, controls the control valves to cause the actual wheel-cylinder pressure to reach the control oil pressure, and turns ON the motor.

5. The vehicular brake controller according to claim 1, wherein the hydraulic pressure control means neither performs the shift suppression control nor turns ON the motor while the wheel cylinder of the high-pressure-side wheel is being depressurized even if the wheel cylinder of the low-pressure-side wheel is being pressurized.

* * * * *